(12) United States Patent
Hiasa et al.

(10) Patent No.: US 11,390,720 B2
(45) Date of Patent: Jul. 19, 2022

(54) SIZING AGENT COATED CARBON FIBER BUNDLE, METHOD FOR MANUFACTURING SAME, PREPREG, AND CARBON FIBER REINFORCED COMPOSITE MATERIAL

(71) Applicant: TORAY INDUSTRIES, INC., Tokyo (JP)

(72) Inventors: Takumi Hiasa, Ehime (JP); Daigo Kobayashi, Ehime (JP); Tomoko Ichikawa, Ehime (JP)

(73) Assignee: TORAY INDUSTRIES, INC., Tokyo (JP)

( * ) Notice: Subject to any disclaimer, the term of this patent is extended or adjusted under 35 U.S.C. 154(b) by 187 days.

(21) Appl. No.: 16/705,353

(22) Filed: Dec. 6, 2019

(65) Prior Publication Data
US 2020/0165400 A1 May 28, 2020

Related U.S. Application Data

(63) Continuation of application No. 15/526,660, filed as application No. PCT/JP2016/050777 on Jan. 13, 2016, now Pat. No. 10,544,275.

(30) Foreign Application Priority Data

Jan. 21, 2015 (JP) ............................. JP2015-009121
Mar. 9, 2015 (JP) ............................. JP2015-045598

(51) Int. Cl.
| | |
|---|---|
| *C08J 5/24* | (2006.01) |
| *D06M 15/705* | (2006.01) |
| *C08J 5/06* | (2006.01) |
| *D06M 15/70* | (2006.01) |
| *D06M 13/11* | (2006.01) |
| *B05D 3/00* | (2006.01) |
| *B05D 1/00* | (2006.01) |
| *B05D 3/12* | (2006.01) |
| *C08G 59/14* | (2006.01) |
| *D06M 101/40* | (2006.01) |

(52) U.S. Cl.
CPC .................. *C08J 5/24* (2013.01); *B05D 1/00* (2013.01); *B05D 3/007* (2013.01); *B05D 3/12* (2013.01); *C08G 59/1405* (2013.01); *C08J 5/06* (2013.01); *D06M 13/11* (2013.01); *D06M 15/70* (2013.01); *D06M 15/705* (2013.01); *B05D 2259/00* (2013.01); *C08J 2363/00* (2013.01); *D06M 2101/40* (2013.01); *D06M 2200/40* (2013.01)

(58) Field of Classification Search
CPC ...... B05D 3/007; B05D 1/00; B05D 2259/00; B05D 3/12; C08J 5/24
See application file for complete search history.

(56) References Cited

U.S. PATENT DOCUMENTS

| | | | |
|---|---|---|---|
| 3,957,716 A | 5/1976 | Weldy | |
| 9,683,326 B2 | 6/2017 | Arai et al. | |
| 2006/0258810 A1 | 11/2006 | Suguira | |
| 2013/0089736 A1* | 4/2013 | Nakayama | .......... D06M 15/555 427/532 |
| 2015/0025191 A1* | 1/2015 | Naito | ..................... D04H 3/002 428/367 |
| 2015/0247025 A1 | 9/2015 | Ichikawa et al. | |

FOREIGN PATENT DOCUMENTS

| | | |
|---|---|---|
| CN | 104195766 A | 12/2014 |
| JP | 7-9444 A | 1/1995 |
| JP | 2001-271230 A | 10/2001 |
| JP | 2002-294568 A | 10/2002 |
| JP | 2002-317382 A | 10/2002 |
| JP | 2003-336129 A | 11/2003 |
| JP | 2004-149981 A | 5/2004 |

(Continued)

OTHER PUBLICATIONS

International Preliminary Report on Patentability and Written Opinion dated Aug. 3, 2017, in PCT International Application No. PCT/JP2016/050777, with English translation.

(Continued)

*Primary Examiner* — Dah-Wei D. Yuan
*Assistant Examiner* — Kristen A Dagenais-Englehart
(74) *Attorney, Agent, or Firm* — Birch, Stewart, Kolasch & Birch, LLP

(57) ABSTRACT

Provided are a sizing agent coated carbon fiber bundle that has excellent mechanical characteristics when used as a carbon fiber reinforced composite material, as well as excellent ease of handling; a method for manufacturing the same; and a prepreg and carbon fiber reinforced composite material of excellent mechanical characteristics, employing the fiber bundle. The carbon fiber bundle is coated with a sizing agent that includes a polyether aliphatic epoxy compound having two or more epoxy groups per molecule and/or a polyol aliphatic epoxy compound or a non-water-soluble compound having a glass transition temperature of −100-50° C., wherein the sizing agent coated carbon fiber bundle is characterized in that the flatness ratio (width/thickness) of the carbon fiber bundle cross section is 10-150, and a two edge part/center part sizing agent deposition ratio, obtained by dividing the carbon fiber bundle in the width direction along the fiber direction into three equal parts by mass, and computing the ratio from the ratio of the mass of the sizing agent to the mass of the carbon fiber bundle in the center part and in both end parts, is 1.05-1.5.

5 Claims, No Drawings

(56) References Cited

FOREIGN PATENT DOCUMENTS

| JP | 2006-144158 A | | 6/2006 |
|---|---|---|---|
| JP | 2007-70204 A | | 3/2007 |
| JP | 2008-95222 A | | 4/2008 |
| JP | 2008095222 A | * | 4/2008 |
| JP | 2009-191425 A | | 8/2009 |
| JP | 2009-242964 A | | 10/2009 |
| JP | 2013-23785 A | | 2/2013 |
| JP | 2013023785 A | * | 2/2013 |
| JP | 2014-145038 A | | 8/2014 |
| WO | WO 2014/017339 A1 | | 1/2014 |

OTHER PUBLICATIONS

International Search Report for PCT/JP2016/050777 (PCT/ISA/210) dated Apr. 12, 2016.
Machine English translation of JP 2008-95222 A, Apr. 24, 2008.
Machine Translation of JP 2008-095222 (Apr. 24, 2008).
Plaintiff's Exhibit 11 (product catalog of Zeon Corporation) submitted with Opposition filed in corresponding Japanese Patent Application No. 5967334, with partial English translation.
Plaintiff's Exhibit 8 (product catalog of Mitsubishi Chemical corporation, 2016) submitted with Opposition filed in corresponding Japanese Patent Application No. 5967334, with partial English translation.
Written Opinion of the International Searching Authority for for PCT/JP2016/050777 (PCT/ISA/237) dated Apr. 12, 2016.

* cited by examiner

SIZING AGENT COATED CARBON FIBER BUNDLE, METHOD FOR MANUFACTURING SAME, PREPREG, AND CARBON FIBER REINFORCED COMPOSITE MATERIAL

CROSS-CITE TO RELATED APPLICATIONS

This application is a Continuation of U.S. application Ser. No. 15/526,660, filed on May 12, 2017, which is the National Phase under 35 U.S.C. § 371 of International Application No. PCT/JP2016/050777, filed on Jan. 13, 2016, which claims the benefit under 35 U.S.C. § 119(a) to Japanese Patent Application Nos. 2015-009121 filed on Jan. 21, 2015, and 2015-045598 filed on Mar. 9, 2015, all of which are hereby expressly incorporated by reference into the present application.

TECHNICAL FIELD

The present invention relates to a sizing agent coated carbon fiber bundle that is excellent in process passability, has excellent adhesion to a matrix resin, and constitutes a carbon fiber reinforced composite material having high mechanical strength, and a method for producing the same.

BACKGROUND ART

Carbon fibers are lightweight and also have excellent strength, rigidity, dimensional stability and the like. Accordingly, composite materials combined with various matrix resins have been used in a large number of fields, including airplane components, spacecraft components, automobile components, ship components, civil engineering and construction materials, sporting goods, and the like. In a carbon fiber reinforced composite material using a carbon fiber, it is important that adhesion between the carbon fiber and the matrix resin is excellent in order to take advantage of excellent characteristics of the carbon fiber.

In order to improve the adhesion between a carbon fiber and a matrix resin, usually, a method in which the carbon fiber is subjected to an oxidation treatment such as gas-phase oxidation or liquid-phase oxidation and thereby introducing oxygen-containing functional groups into the carbon fiber surface, has been performed. For example, a method in which a carbon fiber is subjected to an electrolytic treatment and thereby improving the interlaminar shear strength, which is an index of adhesion, has been proposed (Patent Document 1). However, in recent years, as the level of required characteristics to a composite material is improved, the adhesion achievable only by such oxidation treatment is being insufficient.

Particularly, in a carbon fiber having few functional groups and a molded article of a carbon fiber reinforced composite material using a matrix resin, a sizing agent to be applied to the carbon fiber has been studied, for the purpose of improving interfacial adhesion between the carbon fiber and the matrix resin. As such a sizing agent, a phenolic resin, a melamine resin, a bismaleimide resin, an unsaturated polyester resin, an epoxy resin or the like has been preferably used. Among them, epoxy resins have excellent heat resistance, moldability, and adhesion to a carbon fiber, and are suitable as a sizing agent that provides a carbon fiber reinforced composite material having high mechanical strength. For example, methods in which a carbon fiber bundle is coated with, as a sizing agent, diglycidyl ether of bisphenol A has been proposed (Patent Documents 2 and 3). In addition, methods in which a carbon fiber bundle is coated with an epoxy adduct of a polyalkylene glycol as a sizing agent has been proposed, and it is administered that excellent adhesion is exhibited between the carbon fiber and the matrix resin, and the strength of carbon fiber reinforced composite material is particularly improved (Patent Documents 4, 5, and 6).

On the other hand, application of a sizing agent to a carbon fiber bundle is used also for the purpose of suppressing fluffing due to single yarn breakage in processing process like sheet preparation such as prepreg and molding such as filament winding, and improving processability and handleability. For example, various sizing processing methods have been suggested to thermosetting resin matrices such as epoxy resins, and particularly, sizing agents obtained by adding polyurethane or the like to an epoxy resin as a component for enhancing bundling properties are much suggested (see Patent Documents 7 and 8).

On the other hand, sizing agents having more excellent bundling properties are suggested in so-called short fiber applications like cut yarn and middle yarn. Also, sizing agents for a carbon fiber obtained by blending a polyamide resin (Patent Documents 9 and 10), sizing agents obtained by mixing a polycarbonate resin and a polymaleimide resin and an epoxy resin (Patent Documents 11 and 12) and the like are suggested.

PRIOR ART DOCUMENTS

Patent Documents

Patent Document 1: Japanese Patent Laid-open Publication No. 04-361619
Patent Document 2: U.S. Pat. No. 3,957,716
Patent Document 3: Japanese Patent Laid-open Publication No. 57-171767
Patent Document 4: Japanese Patent Laid-open Publication No. 57-128266
Patent Document 5: U.S. Pat. No. 4,555,446
Patent Document 6: Japanese Patent Laid-open Publication No. 62-33872
Patent Document 7: Japanese Patent Laid-open Publication No. 9-250087
Patent Document 8: Japanese Patent No. 6-065787
Patent Document 9: Japanese Patent Laid-open Publication No. 9-003777
Patent Document 10: Japanese Patent Laid-open Publication No. 2003-105676
Patent Document 11: Japanese Patent Laid-open Publication No. 62-021872
Patent Document 12: Japanese Patent Laid-open Publication No. 02-064133

SUMMARY OF THE INVENTION

Problems to be Solved by the Invention

However, by the recent development of various technologies for molding processing of a carbon fiber reinforced composite material, required levels for processability and handleability are increasing year by year, and even in sizing agents exhibiting especially excellent adhesion, as described in Patent Documents 4, 5 and 6, it has been necessary to apply further excellent processability and handleability.

Also, according to the methods described in Patent Documents 9 and 10 and Patent Documents 11 and 12, while it is administered that bundling properties and abrasion resistance of the carbon fiber bundle are improved, there has been no technical idea that adhesion between the carbon fiber and the matrix resin is positively improved by a sizing agent. In addition, there has been no technical idea of further enhancing flexibility of the carbon fiber when used as a continuous fiber.

In view of the above-described problem of the conventional technologies, it is an object of the present invention to provide a sizing agent coated carbon fiber bundle that has high abrasion resistance and is excellent in process passability, and is also excellent in interfacial adhesion between the carbon fiber and the matrix resin and shape stability, and gives excellent dynamic characteristics when formed to a carbon fiber composite material and a method for producing the same, a prepreg, and a carbon fiber reinforced composite material using the carbon fiber bundle.

Solutions to the Problems

The present inventors have found that a large amount of a specific sizing agent is attached to the both end parts of the widened carbon fiber bundle, whereby the carbon fiber has high interfacial adhesion with the matrix resin, and generation of fluff due to abrasion when the carbon fiber bundle passes through the process can be suppressed, thereby arriving at the present invention.

Thus, the present invention is a sizing agent coated carbon fiber bundle that is a carbon fiber bundle coated with (A) a sizing agent containing a polyether-type aliphatic epoxy compound and/or polyol-type aliphatic epoxy compound having two or more epoxy groups in a molecule or (B) a sizing agent containing a water-insoluble compound having a glass transition temperature of −100° C. or more and 50° C. or less, wherein the flatness ratio (width/thickness) defined by the ratio of the width to the thickness of the cross section of the carbon fiber bundle is 10 or more and 150 or less, and when the carbon fiber bundles are divided into three equal parts by mass in the width direction along the fiber direction, the amount ratio of the sizing agent attached to the both end parts/center part calculated from the average value of the ratios of the masses of the sizing agent to the masses of the carbon fiber bundle in each of the both end parts and the ratio of the mass of the sizing agent to the mass of the carbon fiber bundle in the center part is 1.05 or more and 1.5 or less.

In addition, the present invention is a method for producing the sizing agent coated carbon fiber bundle, wherein the carbon fiber bundle is impregnated with a sizing agent solution containing a sizing agent and then brought into contact with a roller heated in a temperature range higher than the boiling point of a solvent of the sizing agent solution by 10° C. or more and 80° C. or less for one second or more and 60 seconds or less.

Moreover, the present invention is a method for producing the sizing agent coated carbon fiber bundle, wherein, in a process of taking out the carbon fiber bundle from the sizing agent solution after impregnating the carbon fiber bundle with the sizing agent solution, the angle formed by a liquid level of the sizing agent solution and the carbon fiber bundle is 20 degrees or more and 70 degrees or less.

Also, the present invention is a method for producing the sizing agent coated carbon fiber bundle, wherein (A) a sizing agent contains a polyether-type aliphatic epoxy compound and/or polyol-type aliphatic epoxy compound having two or more epoxy groups in a molecule, and the time until the carbon fiber bundle is brought into contact with a roller after impregnated with the sizing agent solution is 60 seconds or less.

In addition, the present invention is a method for producing the sizing agent coated carbon fiber bundle, wherein (B) a sizing agent contains a water-insoluble compound having a glass transition temperature of −100° C. or more and 50° C. or less, and the time until the carbon fiber bundle is brought into contact with a roller after impregnated with the sizing agent solution is 3 seconds or more and 30 seconds or less.

Moreover, the present invention is a prepreg containing the sizing agent coated carbon fiber bundle and a thermosetting resin.

Also, the present invention is a carbon fiber reinforced composite material obtainable by curing the prepreg.

In addition, the present invention is a carbon fiber reinforced composite material containing the sizing agent coated carbon fiber bundle and a thermoplastic resin.

Effects of the Invention

According to the present invention, the carbon fiber bundle has excellent interfacial adhesion between the carbon fiber and the matrix resin, and generation of fluff due to abrasion when the carbon fiber bundle passes through the process can be suppressed, thus it is possible to provide a carbon fiber reinforced composite material having excellent dynamic characteristics.

Embodiments of the Invention

Hereinbelow, the embodiment of the present invention will be described.

The present invention is a sizing agent coated carbon fiber bundle that is a carbon fiber bundle coated with (A) a polyether-type aliphatic epoxy compound and/or polyol-type aliphatic epoxy compound having two or more epoxy groups in a molecule or (B) a sizing agent containing a water-insoluble compound having a glass transition temperature of −100° C. or more and 50° C. or less. First, the sizing agent used in the present invention will be described.

The sizing agent used in the present invention contains (A) a polyether-type aliphatic epoxy compound and/or polyol-type aliphatic epoxy compound having two or more epoxy groups in a molecule or (B) a water-insoluble compound having a glass transition temperature of −100° C. or more and 50° C. or less.

First, (A) a polyether-type aliphatic epoxy compound and/or polyol-type aliphatic epoxy compound having two or more epoxy groups in a molecule will be described. Herein, the aliphatic epoxy compound is an epoxy compound containing no aromatic ring in the molecule. An epoxy compound having a plurality of epoxy groups in the molecule and having a flexible aliphatic main chain interacts with surface functional groups of the carbon fiber and firmly adheres to the carbon fiber surface, and interaction and reactivity with a matrix resin, especially an epoxy resin, are high, thus physical properties of a carbon fiber reinforced composite material are improved. The aliphatic epoxy compound used in the present invention may also have other functional groups in the molecule in addition to epoxy groups.

The functional groups that the aliphatic epoxy compound has in addition to an epoxy group is preferably one selected from a hydroxyl group, an amide group, an imide group, a urethane group, a urea group, a sulfonyl group and a sulfo group, and in terms of the interaction with a matrix resin, it is particularly preferable to have a hydroxyl group. The aliphatic epoxy compound used in the present invention is preferably an epoxy compound having two or more kinds of three or more functional groups, and more preferably an epoxy compound having two or more kinds of four or more functional groups. When the aliphatic epoxy compound is an epoxy compound having three or more epoxy groups or other functional groups in a molecule, even when one epoxy group forms a covalent bond with an oxygen-containing functional groups on the carbon fiber surface, remaining two or more epoxy groups or other functional groups can form a covalent bond or hydrogen bond with a matrix resin, thus adhesion is further improved. Although the upper limit of the number of the functional group containing an epoxy group is not particularly set, 10 groups are sufficient in terms of adhesion.

The epoxy equivalent of the aliphatic epoxy compound used in the present invention is preferably 360 g/eq. or less, more preferably 270 g/eq. or less, and further preferably 180 g/eq. or less. When the epoxy equivalent of the aliphatic epoxy compound is 360 g/eq. or less, the aliphatic epoxy compound strongly interacts with the carbon fiber surface, thus adhesion between the carbon fiber and the matrix resin are further improved. Although the lower limit of the epoxy equivalent is not particularly set, an epoxy equivalent of 90 g/eq. or more is sufficient in terms of adhesion.

The aliphatic epoxy compound used in the present invention may be an epoxy compound obtained by the reaction of one member selected from ethylene glycol, diethylene glycol, triethylene glycol, tetraethylene glycol, polyethylene glycol, propylene glycol, dipropylene glycol, tripropylene glycol, tetrapropylene glycol, polypropylene glycol, trimethylene glycol, polybutylene glycol, 1,2-butanediol, 1,3-butanediol, 1,4-butanediol, 2,3-butanediol, 1,5-pentanediol, neopentyl glycol, 1,6-hexanediol, 1,4-cyclohexanedimethanol, glycerol, diglycerol, polyglycerol, trimethylolpropane, pentaerythritol, sorbitol and arabitol, with epichlorohydrin. Among them, it is preferable to use a glycidyl-ether-type epoxy compound obtained by the reaction of one member selected from glycerol, diglycerol, polyglycerol, trimethylolpropane, pentaerythritol, sorbitol and arabitol with epichlorohydrin. These compounds are particularly preferable in that they have high solubility in water, methanol, ethanol, 2-propanol, acetone, methyl ethyl ketone, dimethylformamide, dimethylacetamide, and like polar solvents, and, when the carbon fiber bundle is coated with such a sizing agent, the sizing agent can be used as a uniform sizing agent solution. They may be used alone, and it is also possible to use a combination of two or more kinds.

Specific examples of these compounds as products include polyglycerol polyglycidyl ether (e.g., "Denacol®" EX-512 and EX-521 manufactured by Nagase ChemteX Corporation), trimethylolpropane polyglycidyl ether (e.g., "Denacol®" EX-321 manufactured by Nagase ChemteX Corporation), glycerol polyglycidyl ether (e.g., "Denacol®" EX-313 and EX-314 manufactured by Nagase ChemteX Corporation), sorbitol polyglycidyl ether (e.g., "Denacol®" EX-611, EX-612, EX-614, EX-614B, and EX-622 manufactured by Nagase ChemteX Corporation), pentaerythritol polyglycidyl ether (e.g., "Denacol®" EX-411 manufactured by Nagase ChemteX Corporation), and the like.

Next, (B) a water-insoluble compound having a glass transition temperature of $-100°$ C. or more and $50°$ C. or less will be described. The glass transition temperature is determined by measurement of input compensation DSC, in accordance with JIS 7121 (1987). The water-insoluble compound is used in a sizing agent as a dispersion, by emulsification or self-emulsification. The water-insoluble compound in the present invention is a compound in which the mass of the solid matter remained after mixing 10 parts by mass of the compound per 90 parts by mass of water at $25°$ C., stirring the mixture with a stirrer for 24 hours or more, and filtering the mixture with a filter paper corresponding to one kind in JIS P3801 (1956) is 60% or more. When the glass transition temperature of the sizing agent is $-100°$ C. or more, the sizing agent can be uniformly attached to the carbon fiber bundle since the sizing agent has molecular mobility at room temperature. When the glass transition temperature of the sizing agent is $50°$ C. or less, flexibility can be provided to the carbon fiber bundle even after attaching the sizing agent, and handleability can be favorably kept. As the lower limit of the glass transition temperature of the sizing agent, more preferable range is $-50°$ C. or more, and further preferably $0°$ C. or more. Also, as the upper limit, more preferable range is $40°$ C. or less. Moreover, when the sizing agent contains a water-insoluble compound, the water amount of the carbon fiber bundle is stabilized, regardless of the humidity in atmosphere, thus good shape stability can be maintained.

In the present invention, as the compound that can be used as the water-insoluble compound having a glass transition temperature of $-100°$ C. or more and $50°$ C. or less, a latex compound, a polyacryl compound, a polyurethane compound, a glycidyl-ether-type epoxy compound derived from a polyol, a glycidyl-amine-type epoxy compound derived from an amine having a plurality of active hydrogens, a glycidyl-ester-type epoxy compound derived from a polycarboxylic acid, an epoxy compound obtained by oxidizing a compound having a plurality of double bonds in a molecule or the like, having a glass transition temperature of $-100°$ C. or more and $50°$ C. or less can be preferably mentioned. Copolymers thereof may be also used, and the glass transition temperature of those compounds may be adjusted to $-100°$ C. or more and $50°$ C. or less by controlling the molecular weight by synthesis or the like.

The latex compound refers to a compound comprising a natural rubber and a polymer of a diene monomer. Examples of polymer of a diene monomer include styrene-butadiene rubber, polybutadiene rubber, methyl methacrylate-butadiene rubber, 2-vinylpyridine-styrene-butadiene rubber, acrylonitrile-butadiene rubber, chloroprene rubber, and the like. In the present invention, a water-insoluble latex compound having a glass transition temperature of $-100°$ C. or more and $50°$ C. or less can be selected and used. Specific examples of dispersion of the water-insoluble latex compound having a glass transition temperature of $-100°$ C. or more and $50°$ C. or less include SB (styrene-butadiene) latex 0533, 0545, 0548, 0561, 0568, 0569V, 0573, 0589, 0597C, 0602, 0695 and 0696, manufactured by JSR Corporation, and the like.

The polyacryl compound refers to a compound containing a polymer of acrylic esters or methacrylic esters. The glass transition temperature can be adjusted by controlling the polymerization degree or the copolymerization component. Specific examples of dispersion of the water-insoluble polyacryl compound having a glass transition temperature of $-100°$ C. or more and $50°$ C. or less include "AE®" 110, 116, 120A, 200A, 336B, 337, 373D, 610H, 980, 981A, 982 and 986B, manufactured by EMULSION TECHNOLOGY CO., LTD., and the like.

Specific examples of dispersion of the water-insoluble polyurethane compound having a glass transition temperature of $-100°$ C. or more and $50°$ C. or less include "Baybond®" PU401A, PU405 and PU407, and "Dispercoll®" U54, manufactured by Sumika Bayer Urethane Co., Ltd., and "VONDIC®" series manufactured by DIC Corporation, and the like.

The glycidyl-ether-type epoxy compound having a glass transition temperature of −100° C. or more and 50° C. or less include glycidyl-ether-type epoxy compounds obtained by the reaction of a polyol with epichlorohydrin. Examples include glycidyl-ether-type epoxy compounds obtained by the reaction of at least one kind selected from a group consisting of bisphenol A, bisphenol F, bisphenol AD, bisphenol S, tetrabromobisphenol A, phenol novolac, cresol novolac, hydroquinone, resorcinol, 4,4'-dihydroxy-3,3',5,5'-tetramethylbiphenyl, 1,6-dihydroxynaphthalene, 9,9-bis(4-hydroxyphenyl)fluorene, tris(p-hydroxyphenyl)methane, tetrakis(p-hydroxyphenyl)ethane, neopentyl glycol, 1,6-hexanediol, 1,4-cyclohexanedimethanol, hydrogenated bisphenol A and hydrogenated bisphenol F, with epichlorohydrin. In addition, examples of glycidyl-ether-type epoxy compound include glycidyl-ether-type epoxy compounds having a biphenyl aralkyl skeleton, and glycidyl-ether-type epoxy compounds having a dicyclopentadiene skeleton.

Examples of glycidyl-amine-type epoxy compound having a glass transition temperature of −100° C. or more and 50° C. or less include, other than N,N-diglycidyl aniline and N,N-diglycidyl-o-toluidine, epoxy compounds obtained by the reaction of at least one kind selected from a group consisting of m-xylylenediamine, m-phenylenediamine, 4,4'-diaminodiphenylmethane, 9,9-bis(4-aminophenyl)fluorene and 1,3-bis(aminomethyl)cyclohexane, with epichlorohydrin.

Further, examples of glycidyl-amine-type epoxy compound having a glass transition temperature of −100° C. or more and 50° C. or less include epoxy compounds obtained by reacting both the hydroxyl group an amino group of an aminophenol such as m-aminophenol, p-aminophenol and 4-amino-3-methylphenol, with epichlorohydrin.

Examples of glycidyl-ester-type epoxy compound include glycidyl-ester-type epoxy compounds obtained by reacting phthalic acid, terephthalic acid, hexahydrophthalic acid or dimer acid, with epichlorohydrin.

Examples of epoxy compounds obtained by oxidizing a compound having a plurality of double bonds in a molecule, having a glass transition temperature of −100° C. or more and 50° C. or less, include epoxy compounds having an epoxycyclohexane ring in a molecule. Further, examples of this epoxy compound include epoxidized soybean oils.

The water-insoluble epoxy compound having a glass transition temperature of −100° C. or more and 50° C. or less used in the present invention includes other than these epoxy compounds, epoxy compounds synthesized using the epoxy compound listed above as raw materials, for example, epoxy compounds synthesized by oxazolidone ring formation reaction of bisphenol A diglycidyl ether and tolylene diisocyanate. Also, the water-insoluble epoxy compound having a glass transition temperature of −100° C. or more and 50° C. or less used in the present invention includes epoxy compounds such as triglycidyl isocyanurate.

In the present invention, the water-insoluble compound having a glass transition temperature of −100° C. or more and 50° C. or less used as the sizing agent is preferably an aromatic compound. When the water-insoluble compound having a glass transition temperature of −100° C. or more and 50° C. or less used as the sizing agent is an aromatic compound, due to rigidity of the molecular skeleton, shape stability of the sizing agent coated carbon fiber bundle is improved.

In the present invention, the water-insoluble compound having a glass transition temperature of −100° C. or more and 50° C. or less used as the sizing agent is preferably a latex compound. When the water-insoluble compound having a glass transition temperature of −100° C. or more and 50° C. or less used as the sizing agent is a latex compound, shape stability of the sizing agent coated carbon fiber bundle is maintained, and also flexibility can be imparted since the latex compound has high elongation.

Also, the sizing agent used in the present invention may contain components other than the above. For example, an adhesion-promoting component for enhancing adhesion between sizing agent components and oxygen-containing functional groups contained in the carbon fiber surface and/or the matrix resin, an emulsifier for dispersing sizing agent components and the like can be added. These components can be preferably dissolved in a solvent together with the aliphatic epoxy compound (A) or the water-insoluble compound (B), and uniformly used as the sizing agent component.

An example of adhesion-promoting component includes tertiary amine compounds such as triisopropylamine, dibutylethanolamine, diethylethanolamine, triisopropanolamine, diisopropylethylamine, N-benzylimidazole, 1,8-diazabicyclo[5,4,0]-7-undecene (DBU), 1,5-diazabicyclo[4,3,0]-5-nonene (DBN), 1,4-diazabicyclo[2,2,2]octane, and 5,6-dibutylamino-1,8-diazabicyclo[5,4,0]-undecene-7 (DBA) and salts thereof, quaternary phosphonium salts such as phosphine compounds such as tributylphosphine and triphenylphosphine and salts thereof, and the like. These compounds are blended in an amount of preferably 1 to 25 mass % and further preferably 2 to 8 mass %, relative to the total amount of the sizing agent used in the present invention.

Examples of emulsifier for dispersing sizing agent components include anionic surfactants, cationic surfactants, nonionic surfactants, and the like. When these compounds are used, it is blended in an amount of preferably 0.1 to 25 mass %, relative to the total amount of the sizing agent used in the present invention.

When an aliphatic epoxy compound (A) is contained as the sizing agent used in the present invention, the aliphatic epoxy compound (A) is contained in an amount of preferably 30 parts by mass or more, more preferably 70 parts by mass or more, and further more preferably 85 parts by mass or more, relative to 100 parts by mass of the sizing agent.

When a water-insoluble compound (B) is contained as the sizing agent used in the present invention, the water-insoluble compound (B) is contained in an amount of preferably 30 parts by mass or more, more preferably 70 parts by mass or more, and further more preferably 85 parts by mass or more, relative to 100 parts by mass of the sizing agent.

Also, it is important to widen the sizing agent coated carbon fiber bundle in the present invention such that the flatness ratio of the cross section of the carbon fiber bundle is 10 or more and 150 or less, more preferably 40 or more and 150 or less, and further preferably more than 90 and 150 or less, and maintain this state. Herein, the flatness ratio is a ratio of the bundle width (D) to the thickness (t) of the fiber bundle, D/t. When the flatness ratio is 10 or more, the heated roller can be uniformly brought into contact with the carbon fiber bundle. In addition, when the flatness ratio exceeds 90, fluff suppressing effect in the present invention is further enhanced. When the flatness ratio is 150 or less, thickness unevenness of fibers in the fiber bundle can be suppressed, thus it is preferable when the sizing agent coated carbon fiber bundle is subjected to high-order processing such as prepreg formation and weaving, unevenness in the fiber content can be suppressed also when the sizing agent coated carbon fiber bundle is formed into a carbon fiber reinforced composite material, and the strength of the carbon fiber reinforced composite material is improved.

The flatness ratio of the obtained sizing agent coated carbon fiber bundle is calculated by the following procedure. In arbitrary three points of the carbon fiber bundle, the fiber bundle width is measured so as to be perpendicular to the fiber direction, and the average of the length in the three points is defined as a bundle width (D) of the fiber bundle. Also, the thickness of the fiber bundle is calculated by the following equation.

$$\text{Thickness of Fiber Bundle } (t) \text{ [m]} = (\text{Mass per 1 m of Fiber Bundle [g]})/\{(\text{Specific Gravity of Fiber Bundle [g/m}^3\text{])} \times (\text{Bundle Width } (D) \text{ [m]})\}$$

The ratio of the bundle width to the thickness obtained above, D/t, is defined as a flatness ratio of the fiber bundle.

Furthermore, in the sizing agent coated carbon fiber bundle of the present invention, when the fiber bundles are divided into three equal parts by mass in the width direction along the fiber direction, the amount ratio of the sizing agent attached to the both end parts/center part calculated from the average value of the ratios of the masses of the sizing agent to the masses of the carbon fiber bundle in each of the both end parts and the ratio of the mass of the sizing agent to the mass of the carbon fiber bundle in the center part is 1.05 or more and 1.5 or less. Here, the amount ratio of the sizing agent attached to the both end parts/center part is preferably 1.1 or more, and further preferably 1.2 or more.

In addition, in the sizing agent coated carbon fiber bundle of the present invention, when the fiber bundles are divided into nine equal parts by mass in the width direction along the fiber direction, the amount ratio of the sizing agent attached to the both end parts/center part calculated from the ratio of the masses of sizing agents to the divided carbon fiber bundle in the most end part to the divided carbon fiber bundle at the center part that is fifth from both the right and left ends in the width direction is preferably 1.01 or more and 2 or less. When the carbon fiber bundle passes through rollers and the like during the process, one that is most affected by abrasion with the process parts such as the rollers is the both end parts of the carbon fiber bundle, thus the sizing agent is provided also to the both end parts more than the center part of the carbon fiber bundle, whereby generation of fluff can be suppressed.

Here, the amount ratio of the sizing agent attached to the both end parts/center part when the fiber bundles are divided into three equal parts by mass in the width direction along the fiber direction is 1.05 or more, the effect of suppressing this abrasion fluff is sufficiently exhibited. Also, when the same ratio is 1.5 or less, unevenness in adhesion to a matrix resin generated by uneven attachment of the sizing agent in the fiber bundle when forming into a carbon fiber reinforced composite material using the fiber bundle can be suppressed, and the strength of the carbon fiber reinforced composite material is improved.

When applying the sizing agent containing a water-insoluble compound (B) in the present invention, the amount of attached sizing agent can be reduced, thus it is also possible to provide the carbon fiber bundle with flexibility.

The carbon fiber bundle coated with the sizing agent containing a water-insoluble compound (B) in the present invention preferably has a drape value of 100 mm or more and 200 mm or less. In the present invention, the drape value is obtained by the following method. A sizing agent-attached carbon fiber bundle is cut into a length of 100 cm or more, and the upper end face of the carbon fiber bundle is stuck to a bar parallel to the ground by a tape, twisting is removed from the upper end of the yarn, a weight of 18 g±1 g is hung from the lower end of the yarn, and the carbon fiber bundle is left for 30 minutes or more. The weight is removed, and a sizing agent attached carbon fiber bundle cut into 30 cm from the bottom is placed on a base having a height of 25 cm or more with a horizontal ceiling part, in the state that twisting of the yarn bundle is released, and supported in the state that the part of 25 cm from the tip of the carbon fiber bundle is horizontally projected into the air. After a lapse of one second from removal of the support, a distance of the yarn bundle tip part from the measurement base is read, and this value is used as a drape value (mm). Here, the drape value of the sizing agent coated carbon fiber bundle is preferably 100 mm or more, and further preferably 120 mm or more, as a lower limit. Also, the drape value of the sizing agent coated carbon fiber is preferably 200 mm or less, more preferably 180 mm or less, and further preferably 160 mm or less, as an upper limit. When the drape value is less than 100 mm, the carbon fiber bundle is soft, thus variations in the yarn width occur when the carbon fiber bundles are aligned in one direction, and performance of the carbon fiber reinforced composite material is sometimes not sufficient. In addition, when the drape value is more than 200 mm, the carbon fiber bundle becomes rigid and attempts to keep straightness, thus sometimes cannot maintain a stable form when wound and stored in a paper tube.

When an aliphatic epoxy compound (A) is contained as the sizing agent used in the present invention, the average amount of the sizing agent attached to the total carbon fiber bundles is preferably in the range of 0.1 to 10 parts by mass and more preferably in the range of 0.2 to 3 parts by mass, per 100 parts by mass of the carbon fiber bundles. When the average amount of attached sizing agent is 0.1 parts by mass or more, the sizing agent coated carbon fiber bundle can resist abrasion of passing metal guide and the like when subjected to prepreg formation, weaving and the like, and generation of fluff is suppressed, thus a prepreg using the carbon fiber bundle and the like are excellent in quality. Meanwhile, when the average amount of attached sizing agent is 10 parts by mass or less, the matrix resin is impregnated into the carbon fiber bundle without being inhibited by a sizing agent film around the carbon fiber bundle, and void formation is suppressed in the obtained composite material, thus the composite material is excellent in quality, and excellent in mechanical physical properties at the same time. At this time, it is preferable that the concentration/temperature of the sizing agent solution, the yarn tension and the like are controlled in order for the amount of sizing agent components attached to the carbon fiber to be within the appropriate range. As the concentration of the sizing agent solution, it is preferable to use a solution having sizing agent components at 0.1 mass % or more and 20 mass % or less, and more preferably 0.2 mass % or more and 5 mass % or less.

When a water-insoluble compound (B) is contained as the sizing agent used in the present invention, the average amount of the sizing agent attached to the total carbon fiber bundles is preferably in the range of 0.2 parts by mass or more and less than 1.5 parts by mass. As a lower limit of the average amount of attached sizing agent is preferably 0.2 parts by mass or more, and more preferably 0.4 parts by mass or more. As an upper limit of the average amount of attached sizing agent is preferably less than 1.5 parts by mass, and more preferably 1.0 part by mass or less. When the average amount of attached sizing agent is 0.2 parts by mass or more, the sizing agent coated carbon fiber bundle can resist abrasion of passing metal guide and the like when subjected to prepreg formation, weaving and the like, and generation of fluff is suppressed, thus a prepreg using the carbon fiber bundle and the like are excellent in quality. Meanwhile, when the average amount of attached sizing agent is less than 1.5 parts by mass, the matrix resin is impregnated into the carbon fiber bundle without being inhibited by a sizing agent film around the carbon fiber bundle, and void formation is suppressed in the obtained composite material, thus the composite material is excellent in quality, and excellent in mechanical physical properties at the same time. Also, flexibility can be provided.

Examples of carbon fiber used in the present invention include polyacrylonitrile-based, rayon-based and pitch-based carbon fibers, and particularly, a polyacrylonitrile-based carbon fiber that can obtain a light weight and high strength carbon fiber reinforced composite material with good specific strength and specific elastic modulus is preferably used. The strand strength of the carbon fiber is preferably 3.5 GPa or more, more preferably 5 GPa or more, and further preferably 5.5 GPa or more. Also, the strand elastic modulus of the carbon fiber used in the present invention is preferably 220 GPa or more, more preferably 250 GPa or more, and further preferably 280 GPa or more. Further, from the viewpoint of obtaining a carbon fiber with high strength and high elastic modulus, a carbon fiber with small fineness is preferably used. Specifically, the single fiber diameter of the carbon fiber is preferably 7.5 µm or less, more preferably 6 µm or less, and further preferably 5.5 µm or less. The lower limit of the single fiber diameter is not particularly set, but in a single fiber diameter of 4.5 µm or less, single fiber cutting is likely to occur in the process, and productivity may be lowered.

In the present invention, the strand tensile strength and elasticity of the carbon fiber bundle described above can be determined in accordance with JIS-R-7608 (2004), Resin-Impregnated Strand Test Method, according to the following procedure. The resin formulation is as follows: "Celloxide®" 2021P (manufactured by Daicel Chemical Industries, Ltd.)/boron trifluoride monoethylamine (manufactured by Tokyo Chemical Industry Co., Ltd.)/acetone=100/3/4 (part by mass). The curing conditions are as follows: normal pressure, 130° C., 30 minutes. Ten strands of a carbon fiber bundle are subjected to the measurement, and the averages are defined as the strand tensile strength and the strand elasticity, respectively.

The total fineness of the carbon fiber bundle used in the present invention is preferably 400 to 3,000 tex. Also, the number of filaments of the carbon fiber bundle is preferably 1,000 to 100,000, and further preferably 3,000 to 50,000. To further improve adhesion between the carbon fiber and the matrix resin, it is preferable to coat a carbon fiber having a surface roughness (Ra) of 6.0 to 100 nm with the sizing agent described above.

Here, a method for producing a polyacrylonitrile-based carbon fiber will be described.

As the spinning method for obtaining a precursor fiber of the carbon fiber, a spinning method such as a wet process, a dry process, or a dry-wet process may be used. From the viewpoint of easily obtaining a carbon fiber with high strength, a wet process or a dry-wet process is preferably used.

In wet spinning method, a solution obtained by dissolving a polyacrylonitrile homopolymer or copolymer in a solvent can be used as a spinning dope. As the solvent, an organic solvent such as dimethyl sulfoxide, dimethylformamide or dimethylacetamide; or an aqueous solution of an inorganic compound such as nitric acid, sodium rhodanate, zinc chloride or sodium thiocyanate is used. Dimethyl sulfoxide or dimethylacetamide is suitable as a solvent.

The spinning dope as described above is spun through a spinneret and discharged into a spinning bath to be solidified. The spinning bath may use an aqueous solution of the solvent used as a solvent for the spinning dope. It is preferable that the spinning solution contains the same solvent as the solvent of the spinning dope, and an aqueous dimethyl sulfoxide solution and an aqueous dimethylacetamide solution are suitable. The fibers solidified in the spinning bath are washed with water and stretched to give a precursor fiber. The obtained precursor fiber is subjected to a flame-proof treatment and a carbonization treatment, and further to a graphitization treatment as necessary, thereby giving a carbon fiber. As the conditions for the carbonization treatment and the graphitization treatment, it is preferable that the maximum heat treatment temperature is 1,100° C. or more, and more preferably 1,300 to 3,000° C.

In order to improve the adhesion to a matrix resin, the carbon fiber is usually subjected to an oxidation treatment, thereby introducing oxygen-containing functional groups into the surface. As the oxidation treatment method, gas-phase oxidation, liquid-phase oxidation and liquid-phase electrolytic oxidation are used. However, in terms of offering high productivity and allowing the fiber to be uniformly treated, it is preferable to use liquid-phase electrolytic oxidation.

In the present invention, examples of electrolyte solutions for use in liquid-phase electrolytic oxidation include acidic electrolyte solutions and alkaline electrolyte solutions. Examples of acidic electrolyte solutions include inorganic acids such as sulfuric acid, nitric acid, hydrochloric acid, phosphoric acid, boric acid, and carbonic acid, organic acids such as acetic acid, butanoic acid, oxalic acid, acrylic acid, and maleic acid, and salts such as ammonium sulfate and ammonium hydrogen sulfate. Among them, sulfuric acid and nitric acid, which show strong acidity, are preferably used. Specific examples of alkaline electrolyte solutions include aqueous solutions of hydroxides such as sodium hydroxide, potassium hydroxide, magnesium hydroxide, calcium hydroxide, and barium hydroxide, aqueous solutions of carbonates such as sodium carbonate, potassium carbonate, magnesium carbonate, calcium carbonate, barium carbonate, and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate, and aqueous solutions of ammonia, a tetraalkylammonium hydroxide, and hydrazine. Among them, it is preferable to use an aqueous solution of ammonium carbonate or ammonium hydrogen carbonate or an aqueous solution of a tetraalkylammonium hydroxide showing strong alkalinity, from the viewpoint that they do not contain an alkali metal, which inhibits the curing of a matrix resin.

In the present invention, in view of promoting the formation of covalent bonds between sizing agent components and oxygen-containing functional groups on the carbon fiber surface and thereby providing further improved adhesion, it is preferred that the carbon fiber is coated with the sizing agent, after the carbon fiber is subjected to an electrolytic treatment using an alkaline electrolyte solution, or after the carbon fiber is subjected to an electrolytic treatment in an acidic aqueous solution followed by washing with an alkaline aqueous solution. When the carbon fiber is subjected to an electrolytic treatment, a portion excessively oxidized on the carbon fiber surface is present in the interface as a fragile layer, from which portion breakage of a composite material may start. Thus, the excessively oxidized portion is dissolved away with an alkaline aqueous solution, whereby the formation of covalent bonds is promoted.

In the present invention, the alkaline aqueous solution used for washing has a pH preferably in the range of 7 to 14, and more preferably in the range of 10 to 14. Specific examples of alkaline aqueous solutions include aqueous solutions of hydroxides such as sodium hydroxide, potassium hydroxide, magnesium hydroxide, calcium hydroxide, and barium hydroxide, aqueous solutions of carbonates such as sodium carbonate, potassium carbonate, magnesium carbonate, calcium carbonate, barium carbonate, and ammonium carbonate, aqueous solutions of hydrogen carbonates such as sodium hydrogen carbonate, potassium hydrogen carbonate, magnesium hydrogen carbonate, calcium hydrogen carbonate, barium hydrogen carbonate, and ammonium hydrogen carbonate, and aqueous solutions of ammonia, a tetraalkylammonium hydroxide, and hydrazine. Among them, it is preferable to use an aqueous solution of ammonium carbonate or ammonium hydrogen carbonate or an aqueous solution of a tetraalkylammonium hydroxide showing strong alkalinity, from the viewpoint that they do not contain an alkali metal, which inhibits the curing of a matrix resin. As the method of washing the carbon fiber with an alkaline aqueous solution, for example, a dip method or a spray method may be used. Among them, it is preferable to use a dip method, according to which washing is easy. Further, in a preferred mode, a dip method is performed while ultrasonically exciting the carbon fiber.

It is preferable that the concentration of the electrolyte solution used in the present invention is within a range of 0.01 to 5 mol/liter, and more preferably within a range of 0.1 to 1 mol/liter. When the concentration of the electrolyte solution is 0.01 mol/liter or more, the electrolytic treatment voltage can be reduced, which is advantageous in terms of operation cost. Meanwhile, when the concentration of the electrolyte solution is 5 mol/liter or less, it is advantageous in terms of safety.

It is preferable that the temperature of the electrolyte solution used in the present invention is in the range of 10° C. to 100° C., and more preferably in the range of 10° C. to 40° C. When the temperature of the electrolyte solution is 10° C. or more, the efficiency of electrolytic treatment is improved, which is advantageous in terms of operation cost. Meanwhile, when the temperature of the electrolyte solution is 100° C. or less, it is advantageous in terms of safety.

In the present invention, it is preferable that the current density during liquid-phase electrolytic oxidation is in the range of 1.5 to 1,000 A/m$^2$ per m$^2$ of the surface area of the carbon fiber in the electrolytic treatment liquid, and more preferably in the range of 3 to 500 A/m$^2$. When the current density is 1.5 A/m$^2$ or more, the efficiency of electrolytic treatment is improved, which is advantageous in terms of operation cost. Meanwhile, when the current density is 1,000 A/m$^2$ or less, it is advantageous in terms of safety.

In the present invention, it is preferable that the electrical quantity in liquid-phase electrolytic oxidation is optimized according to the carbonization degree of the carbon fiber, and when treating a carbon fiber bundle having a high elastic modulus, a larger electrical quantity is required.

In the present invention, the carbon fiber preferably has a surface oxygen concentration (O/C), which is an atomic ratio of oxygen (O) to carbon (C) on the fiber surface determined by X-ray photoelectron spectroscopy, in the range of 0.05 to 0.50, more preferably in the range of 0.07 to 0.30, and further preferably in the range of 0.10 to 0.30. A surface oxygen concentration (O/C) of 0.05 or more ensures oxygen-containing functional groups on the carbon fiber surface and can provide strong adhesion to a matrix resin. A surface oxygen concentration (O/C) of 0.5 or less can suppress the decrease in strength of the carbon fiber itself due to oxidation.

The surface oxygen concentration (O/C) of the carbon fiber can be determined by X-ray photoelectron spectroscopy according to the following procedure. First, stain and the like attached on the surface of carbon fiber bundles are removed with a solvent, and the carbon fiber bundles are cut into pieces of 20 mm. The pieces are spread on a sample holder made of copper, and then using AlKα1, 2 as the X-ray source, the inside of a sample chamber is kept at 1×10$^{-8}$ Torr. As a correction value of a peak associated with electrification during the measurement, the binding energy value of the main peak (peak top) of $C_{1s}$ is set to 284.6 eV. The $C_{1s}$ peak area can be determined by drawing a straight baseline in the range of 282 to 296 eV. The $O_{1s}$ peak area can be determined by drawing a straight baseline in the range of 528 to 540 eV. The surface oxygen concentration can be calculated as an atomic ratio from the ratio of the $O_{1s}$ peak area to the $C_{1s}$ peak area using an apparatus-specific sensitivity correction value.

In the present invention, the carbon fiber bundles, after being subjected to an electrolytic treatment or washed with an alkaline aqueous solution, are preferably washed with water and dried. In this case, the carbon fiber is preferably dried at the lowest possible temperature because an excessively high drying temperature is likely to cause a thermal decomposition and elimination of functional groups at the outermost surface of the carbon fiber. Specifically, the drying temperature is preferably 250° C. or less, and further preferably 210° C. or less. Meanwhile, considering drying efficiency, the drying temperature is preferably 110° C. or more, and more preferably 140° C. or more.

In this manner, the carbon fiber bundle suitably used in the present invention can be produced.

Next, a method for producing the sizing agent coated carbon fiber bundle of the present invention will be described.

First, a means of applying a sizing agent to a carbon fiber bundle used in the present invention will be described. In the present invention, a sizing agent is preferably diluted with a solvent and used as a homogeneous solution. Examples of such solvent include water, methanol, ethanol, 2-propanol, acetone, methyl ethyl ketone, dimethylformamide, dimethylacetamide, and the like. Among them, water, which is easy to handle and advantageous in terms of safety, is suitably used. At this time, when a water-insoluble compound (B) is used as the sizing agent component, it is preferred to be used as a solution by dispersing the water-insoluble compound in water by emulsification or self-emulsification.

As the application method, a method of applying a sizing agent solution obtained by simultaneously dissolving the sizing agent component used in the present invention and other sizing agent components is applied in one step is preferably used. Alternatively, a method of applying a sizing agent solution obtained by separately dissolving randomly-selected components in a plurality of steps may be used.

Examples of application techniques include a method in which a carbon fiber is immersed in a sizing agent solution through a roller, a method in which a carbon fiber is brought into contact with a roller having a sizing agent solution attached thereto, and a method in which a sizing agent solution is sprayed in mist form to a carbon fiber. For the production of the sizing agent coated carbon fiber bundle of the present invention, it is preferable to use a method in which a carbon fiber is immersed in a sizing agent solution through a roller. In addition, although the sizing agent may be applied in a batch-wise manner or a continuous manner, the continuous manner, which can achieve high productivity and small unevenness, is suitably used. It is also preferable to excite the carbon fiber by ultrasonic waves during the application of the sizing agent.

In the present invention, it is preferable that the concentration/temperature of the sizing agent solution, the yarn tension and the like are controlled in order for the average amount of the sizing agent attached to the total carbon fiber bundles to be within the appropriate range. As the concentration of the sizing agent solution, it is preferable to use a solution having sizing agent components at 0.1 mass % or more and 20 mass % or less, and more preferably 0.2 mass % or more and 5 mass % or less.

In the present invention, after applying a sizing agent solution, it is preferred to bring a carbon fiber bundle into contact with a heated roller to obtain a sizing agent coated carbon fiber bundle. The carbon fiber bundle introduced to the heated roller is pressed to the heated roller by tension, and is rapidly dried, thus the flat state of the carbon fiber bundle widened with the heated roller is fixed by a sizing agent, and also a sizing agent reservoir is generated in both edges of the carbon fiber bundle, thus the sizing agent can be attached to the both edge parts more than the center part in the width direction of the fiber bundle.

The temperature of the heated roller is preferably higher than the boiling point of a solvent used for the sizing agent solution by 10° C. or more. The temperature of the heated roller is higher than the boiling point by 10° C. or more, whereby the solvent component is rapidly evaporated, and the sizing agent can be much attached to the both edge parts more than the center part in the width direction of the carbon fiber bundle. Also, the temperature of the heated roller is preferably kept to the boiling point of the solvent used for the sizing agent solution +80° C. or less, and more preferably kept to the boiling point of the solvent used for the sizing agent solution +70° C. or less. When the temperature of the heated roller is the boiling point of the solvent used for the sizing agent solution +80° C. or less, the carbon fiber bundle is mildly heated, whereby damage of the carbon fiber itself can be suppressed, thus fluff suppressing effect in the present invention can be sufficiently exhibited.

In the present invention, the time to bring the carbon fiber bundle into contact with the heated roller is preferably 60 seconds or less, more preferably 30 seconds or less, and further preferably 15 seconds or less. When the contact time on the heated roller is 60 seconds or less, thermal degradation of the coated sizing agent component can be suppressed, and the shorter the contact time, adhesion of stain derived from the sizing agent on the heated roller can be suppressed. In addition, when the contact time on the heated roller is one second or more, the solvent of the sizing agent solution can be sufficiently removed, and the amount of the sizing agent attached to the both edge parts in the width direction of the fiber bundle, and fluff suppressing effect in the present invention is enhanced.

Also, it is desired that the tension of the fiber bundle is properly adjusted to widen the carbon fiber bundle such that the flatness ratio of the carbon fiber bundle is controlled by yarn tension, the distance between the rollers of guide rollers and heated rollers, the roller diameters and the like, so as to have a desired flatness of the carbon fiber bundle. The fiber bundle is preferably widened on the heated roller and/or in a step prior to be brought into contact with the heated roller, but also can be widened after brought into contact with the heated roller.

In a process of taking out the carbon fiber bundle from the sizing agent solution after impregnating the carbon fiber bundle with the sizing agent solution, the carbon fiber bundle is preferably drawn such that the angle formed by a liquid level of the sizing agent solution and the carbon fiber bundle is 20 degrees or more and 70 degrees or less. When the angle formed by a liquid level of the sizing agent solution and the carbon fiber bundle is 70 degrees or less, the liquid amount of the sizing agent solution in which the carbon fiber bundle takes out from the liquid level becomes sufficiently large, and the sizing agent can be attached to the both edge parts more than the center part in the width direction of the carbon fiber bundle by bringing the carbon fiber bundle into contact with the heated roller, and particularly excellent fluff suppressing effect is obtained. Also, when the angle formed by a liquid level of the sizing agent solution and the carbon fiber bundle is 20 degrees or more, the heated roller after taken out is arranged near a tank containing the sizing agent solution, and the process length can be shortened, thus it is particularly excellent in terms of productivity.

Also, in the area where a carbon fiber bundle in a wet state runs, focusing of the carbon fiber bundle by the surface tension of the sizing agent solution occurs, and also the solvent of the sizing agent solution attached to the carbon fiber bundle is evaporated. Therefore, it is preferred to shorten the time until the carbon fiber bundle is brought into contact with the heated roller after taken out from the sizing agent solution, to produce the sizing agent coated carbon fiber bundle of the present invention. When an aliphatic epoxy compound (A) is used as the sizing agent used in the present invention, the time until the carbon fiber bundle is brought into contact with the heated roller after taken out from the sizing agent solution is preferably 60 seconds or less, and further preferably 30 seconds or less. When the time until the carbon fiber bundle is brought into contact with the heated roller after taken out from the sizing agent solution is 60 seconds or less, evaporation of the solvent from the carbon fiber bundle in a wet state can be suppressed, the effect of much attaching the sizing agent to the both edge parts more than the center part in the width direction of the carbon fiber bundle when brought into contact with the heated roller is enhanced, and particularly excellent fluff suppressing effect is obtained.

When a water-insoluble compound (B) is used as the sizing agent used in the present invention, the time until the carbon fiber bundle is brought into contact with the heated roller after impregnated with the sizing agent solution is preferably 3 seconds or more and 30 seconds or less. When the time until the carbon fiber bundle is brought into contact with the heated roller is 3 seconds or more, it is preferred since the sizing agent solution is sufficiently impregnated into the inside of the carbon fiber bundle. When the time until the carbon fiber bundle is brought into contact with the heated roller after taken out from the sizing agent solution is 30 seconds or less, evaporation of the solvent from the carbon fiber bundle in a wet state can be suppressed, the effect of much attaching the sizing agent to the both edge parts more than the center part in the width direction of the carbon fiber bundle when brought into contact with the heated roller is enhanced, and particularly excellent fluff suppressing effect is obtained.

When a water-insoluble compound (B) is used as the sizing agent, after the heated roller is passed, the sizing agent coated carbon fiber bundle of the present invention may be further heat-treated. Either contact type or noncontact type heating system may be adopted to the heat treatment. By performing heat treatment, an interaction between the sizing agent component and the functional group on the carbon fiber surface can be further enhanced. As heat treatment conditions, a temperature in a range of 160° C. to 260° C. for 30 seconds or more and 600 seconds or less is preferred. At 160° C. or more or for 30 seconds or more, adhesion between the carbon fiber bundle with the matrix resin is further increased. At 260° C. or less or for 600 seconds or less, thermal degradation of the sizing agent component can be suppressed. Also when (A) is used as the sizing agent, after the heated roller is passed, heat treatment is preferably performed in a range of 160° C. to 260° C. for 30 seconds or more and 600 seconds or less. In addition, it is possible to perform the heat treatment by microwave irradiation and/or infrared irradiation.

As another application means of a sizing agent to the carbon fiber bundle used in the present invention, a method in which a sizing agent component is added to an electrolytic solution, and then applied to the carbon fiber surface at the same time as electrolytic treatment, and also a method in which a sizing agent component is added in the washing step after electrolytic treatment, and then applied to the carbon fiber bundle at the same time as water washing. In these cases, the average amount of attached sizing agent can be controlled by the concentration and temperature of the electrolytic treatment liquid, yarn tension, and the like. The sizing agent coated carbon fiber of the present invention is used, for example, in the form of a tow, a woven fabric, a knitted fabric, a plaited cord, a web, a mat, or chopped. In particular, when used for applications where high specific strength and high specific elasticity are required, a tow with the carbon fibers being aligned in one direction is most suitable. Further, it is preferable to use a prepreg impregnated with a matrix resin.

Next, the prepreg and the carbon fiber reinforced composite material of the present invention will be described.

The sizing agent coated carbon fiber of the present invention can be used as a prepreg and a carbon fiber reinforced composite material in combination with a matrix resin. By using the sizing agent coated carbon fiber bundle of the present invention, generation of fluff due to abrasion when passing through the process can be suppressed, thus a prepreg with excellent quality is obtained, and also, damage of carbon fiber when passing through the process can be suppressed, thus a carbon fiber reinforced composite material with excellent strength is obtained.

As a matrix resin of the prepreg and the carbon fiber reinforced composite material of the present invention, it is possible to use both a thermosetting resin and a thermoplastic resin. First, a prepreg and a carbon fiber reinforced composite material when the matrix resin is a thermosetting resin will be described. Examples of thermosetting resins include resins such as unsaturated polyester resin, vinyl ester resins, epoxy resins, phenol resins, melamine resins, urea resins, thermosetting polyimide resins, cyanate ester resins, and bismaleimide resins, modification products thereof, and resins composed of two or more kinds blended. Among them, it is preferable to use an epoxy resin, which has an excellent balance of mechanical characteristics and is advantageous in that cure shrinkage is small.

Epoxy compounds used for the epoxy resin are not particularly limited, and it is possible to use at least one member selected from a bisphenol-type epoxy compound, an amine-type epoxy compound, a phenol novolac-type epoxy compound, a cresol novolac-type epoxy compound, a resorcinol-type epoxy compound, a phenol aralkyl-type epoxy compound, a naphthol aralkyl-type epoxy compound, a dicyclopentadiene-type epoxy compound, an epoxy compound having a biphenyl skeleton, an isocyanate-modified epoxy compound, a tetraphenylethane-type epoxy compound, a triphenylmethane-type epoxy compound, and the like.

In addition, examples of curing agents include, but are not particularly limited to, aromatic amine curing agents, dicyanamide, and derivatives thereof. In addition, it is also possible to use an amine such as alicyclic amine, a phenolic compound, an acid anhydride, polyamidoamino, organic acid hydrazide, or isocyanate together with an aromatic amine curing agent.

Among them, it is preferable to use an epoxy resin containing a polyfunctional glycidylamine-type epoxy resin and an aromatic diamine curing agent. Generally, a matrix resin containing a polyfunctional glycidylamine-type epoxy resin and an aromatic diamine curing agent has a high crosslinking density, and can improve the heat resistance and compressive strength of a carbon fiber reinforced composite material.

As polyfunctional glycidylamine-type epoxy resins, tetraglycidyl diaminodiphenylmethane, triglycidyl aminophenol, triglycidyl aminocresol, and the like can be preferably used. A polyfunctional glycidylamine-type epoxy resin has an effect to enhance the heat resistance, and its proportion is preferably contained in an amount of 30 to 100 mass % in 100 mass % of the total epoxy resin. In the case where the proportion of the glycidylamine-type epoxy resin is 30 mass % or more, the compressive strength of the carbon fiber reinforced composite material is improved, resulting in excellent heat resistance.

The aromatic diamine curing agent is not particularly limited as long as it is an aromatic amine used as an epoxy resin curing agent. Specific preferred examples thereof include 3,3'-diaminodiphenylsulfone (3,3'-DDS), 4,4'-diaminodiphenylsulfone (4,4'-DDS), diaminodiphenylmethane (DDM), diaminodiphenyl ether (DADPE), bisaniline, benzyldimethylaniline, 2-(dimethylaminomethyl)phenol (DMP-10), 2,4,6-tris(dimethylaminomethyl)phenol (DMP-30), and tri-2-ethylhexylate of DMP-30, as well as isomers and derivatives thereof. They may be used alone, and it is also possible to use a mixture of two or more kinds.

It is preferable that the above aromatic diamine curing agent is contained in an amount of 50 to 120 mass %, more preferably 60 to 120 mass %, and further preferably 70 to 90 mass %, of the stoichiometric amount relative to the total epoxy resin. When the aromatic amine curing agent is 50 mass % or more of the stoichiometric amount relative to the total epoxy resin, the obtained resin cured product has excellent heat resistance. In addition, in the case where the aromatic amine curing agent is 120 mass % or less, the toughness of the resulting resin cured product is improved.

In addition, for the purpose of promoting the curing of the epoxy resin, a curing accelerator may also be blended. Examples of curing accelerator include urea compounds, tertiary amines and salts thereof, imidazoles and salts thereof, triphenylphosphine and derivatives thereof, metal carboxylates, Lewis acid, and Bronsted acids and salts thereof.

In the matrix resin of the carbon fiber reinforced composite material of the present invention, a thermoplastic resin may be blended in order to improve the physical properties, such as toughness, of the resulting resin cured product. As such thermoplastic resins, for example, a thermoplastic resin having, on the main chain, a bond selected from a carbon-carbon bond, an amide bond, an imide bond (polyetherimide, etc.), an ester bond, an ether bond, a siloxane bond, a carbonate bond, a urethane bond, a urea bond, a thioether bond, a sulfone bond, an imidazole bond and a carbonyl bond, can be used. For example, polyethersulfone and polyetherimide are preferable.

Further, in order to modify the matrix resin used in combination with the sizing agent coated carbon fiber bundle of the present invention, it is also possible to blend thermosetting resins other than the thermosetting resin used in the matrix resin, an elastomer, a filler, rubber particles, thermoplastic resin particles, inorganic particles, and other additives.

As the thermoplastic resin particles, those same as the various thermoplastic resins mentioned above may be used. Among them, polyamide particles and polyimide particles are preferably used. Among polyamides, Nylon 12, Nylon 6, Nylon 11 and Nylon 6/12 copolymers are preferable because they can impart particularly excellent adhesive strength with a thermosetting resin, whereby the carbon fiber reinforced composite material has high delamination strength at the time of drop-weight impact, resulting in a high improving effect on impact resistance.

The thermoplastic resin particles may have the shape of spherical particles, non-spherical particles, or porous particles. However, because a spherical shape prevents a decrease in flow characteristics of the resin, resulting in excellent viscoelasticity, and also does not provide a starting point for stress concentration, offering high impact resistance, the particles are spherical in a preferred mode.

As the rubber particles, in terms of handleability and the like, it is preferable to use cross-linked rubber particles and core-shell rubber particles composed of cross-linked rubber particles with a different kind of polymer graft-polymerized on the surface thereof.

The prepreg of the present invention can be produced by a wet process in which the above matrix resin is dissolved in a solvent such as methyl ethyl ketone or methanol to reduce the viscosity, followed by impregnation, or a hot-melt process (dry process) in which the resin is heated to reduce the low viscosity, followed by impregnation, or the like. The hot-melt process is a preferred method since no solvent is substantially remained in the prepreg.

The carbon fiber reinforced composite material of the present invention can be prepared by a method of laminating the obtained prepreg, then heating and curing a matrix resin while applying a pressure to the laminate. As a method for applying heat and pressure, a press-molding method, an autoclave molding method, a bagging molding method, a wrapping tape method, an internal-pressure molding method, a vacuum-pressure molding method, or the like is herein adopted. By any of these molding methods, generation of fluff in the molding process can be suppressed by the sizing agent coated carbon fiber bundle of the present invention, and a carbon fiber reinforced composite material with excellent strength and quality can be obtained.

Next, a carbon fiber reinforced composite material when the matrix resin is a thermoplastic resin will be described.

The carbon fiber reinforced composite material using a thermoplastic resin as the matrix resin is molded, for example, by a molding method such as injection molding (injection compression molding, gas-assisted injection molding, insert molding, etc.), blow molding, rotation molding, extrusion molding, press molding, transfer molding, and filament-winding molding. As the form of a molding material used in the molding, a cloth in the form of a web, a nonwoven fabric, or a sheet such as a felt or a mat, or the like, a pellet, a prepreg and the like can be used. The sizing agent coated carbon fiber bundle of the present invention, when the carbon fiber bundle is processed into these molding materials and/or a carbon fiber reinforced composite material is molded by these molding methods, is excellent in handleability and can suppress generation of fluff and yarn breakage during the molding process, thus a carbon fiber reinforced composite material with excellent quality can be obtained.

Particularly, injection molding is preferably used in terms of productivity, and a pellet is preferred as the form of a molding material. The "pellet" generally refers to a material obtained by kneading a thermoplastic resin and a chopped fiber or a continuous fiber in an extruder, followed by extrusion and pelletizing. In the above-described pellet, the length of the fiber in the pellet is shorter than the length in the longitudinal direction of the pellet, and the pellets also include a long-fiber pellet. The long-fiber pellet refers to one in which fibers are arranged nearly parallel to the longitudinal direction of the pellet, and the length of 50% or more of the carbon fibers of the present invention contained in the pellet is the same as the length of the pellet or more, as described in Japanese Patent No. 63-37694. The phrase "arranged nearly parallel" means the state in which the major axis line of the carbon fiber and the major axis line of the molding material are oriented in the same direction, and the difference in angle between the axis lines is preferably 20° or less, more preferably 10° or less, and further preferably 5° or less. In this case, a thermoplastic resin may be impregnated in a fiber bundle, or a fiber bundle may be covered with a thermoplastic resin. Particularly, in the case of a long-fiber pellet covered with a thermoplastic resin, a fiber bundle may be previously impregnated with a resin that is the same as one covering the long-fiber pellet or a resin having a viscosity (or molecular weight) lower than the resin covering the long-fiber pellet.

It is effective to increase a fiber length in a molded article, in order that a carbon fiber reinforced composite material has both excellent electrical conductivity and dynamic characteristics (particularly, strength and impact resistance), and thus it is preferable to mold an article using a long-fiber pellet among the above-described pellets.

Examples of applications of carbon fiber reinforced composite material comprising the sizing agent coated carbon fiber bundle of the present invention and a thermosetting resin and/or a thermoplastic resin include housings and inner components, such as trays and chassis, as well as cases thereof, of electric and electronic devices, such as personal computers, displays, OA appliances, mobile phones, personal digital assistants, facsimiles, compact discs, portable MDs, portable radio cassette recorders, PDA (personal digital assistants such as an electronic notebook), video cameras, digital still cameras, optical devices, audio devices, air conditioners, lighting devices, entertainment goods, toy goods, and other electrical appliances; mechanism elements; building materials such as panels; parts, components, and outer panels related to automobiles and two-wheeled vehicles, such as motor parts, alternator terminals, alternator connectors, IC regulators, potentiometer bases for light dimmers, suspension parts, various valves such as exhaust gas valves, various fuel-related, exhaust, or suction pipes, air intake nozzle snorkels, intake manifolds, various arms, various frames, various hinges, various bearings, fuel pumps, gas tanks, CNG tanks, engine cooling water joints, carburetor main bodies, carburetor spacers, exhaust gas sensors, cooling water sensors, oil temperature sensors, brake pad wear sensors, throttle position sensors, crank shaft position sensors, air flow meters, brake pad wear sensors, thermostat bases for air conditioners, heater warm air flow control valves, brush holders for radiator motors, water pump impellers, turbine vanes, wiper motor-related parts, distributors, starter switches, starter relays, wire harnesses for gear transmission, window washer nozzles, air conditioner panel switch boards, coils for fuel-related electromagnetic valves, connectors for fuses, battery trays, AT brackets, head lamp supports, pedal housings, handles, door beams, protectors, chassis, frames, armrests, horn terminals, stepping motor rotors, lamp holders, lamp reflectors, lamp housings, brake pistons, noise shields, radiator supports, spare tire covers, sheet shells, solenoid bobbins, engine oil filters, ignition device cases, undercovers, scuff plates, pillar trims, propeller shafts, wheels, fenders, facers, bumpers, bumper beams, bonnets, aero parts, plat forms, cowling louvers, roofs, instrument panels, spoilers, and various modules; airplane-related parts, components, and outer panels, such as landing gear pods, winglets, spoilers, edges, rudders, elevators, fairings, and ribs; and wind mill blades. They are particularly preferable for applications to airplane components, windmill blades, automobile outer panels, and housings, trays, and chassis of electronic devices, for example.

EXAMPLES

Hereinbelow, the sizing agent coated carbon fiber bundle of the present invention will be further specifically described with reference to examples, but these examples are not intended to limit the present invention.

Materials and components used as sizing agent components in each of Examples and Comparative Examples are as described below.

(I) "Denacol®" EX-611 (manufactured by Nagase ChemteX Corporation: sorbitol polyglycidyl ether, water soluble)

(II) "Denacol®" EX-521 (manufactured by Nagase ChemteX Corporation: polyglycerol polyglycidyl ether, water soluble)

(III) "jER®" 828 (manufactured by Mitsubishi Chemical Corporation: diglycidyl ether of bisphenol A, water insoluble, glass transition temperature of −15° C.)

(IV) SB latex 0573 (manufactured by JSR Corporation: water-insoluble emulsion containing a water-insoluble styrene-butadiene latex and an emulsifier, glass transition temperature of water-insoluble component of −7° C.)

(V) "Baybond®" PU407 (manufactured by Sumika Bayer Urethane Co., Ltd: water soluble emulsion containing a water-insoluble polyurethane and an emulsifier, glass transition temperature of water-insoluble component of −46° C.).

(VI) Water soluble emulsion obtained by emulsifying "jER®" 828 (manufactured by Mitsubishi Chemical Corporation: diglycidyl ether of bisphenol A, water insoluble, glass transition temperature of −15° C.) with an emulsifier.

(VII) SB latex 0640 (manufactured by JSR Corporation: water-insoluble emulsion containing a water-insoluble styrene-butadiene latex and an emulsifier, glass transition temperature of water-insoluble component of 105° C.)

(VIII) Polyethylene glycol (manufactured by Wako Pure Chemical Industries, Ltd.: water soluble, average molecular weight of 400).

Methods for evaluating a sizing agent coated carbon fiber bundle conducted in each of Examples and Comparative Examples are as described below.

<Measurement of Interfacial Shear Strength (IFSS)>

The interfacial shear strength (IFSS) was determined by the following procedures (a) to (d).

(a) Preparation of Resin

Into a container, 100 parts by mass of a bisphenol A-type epoxy resin "jER®" 828 (manufactured by Mitsubishi Chemical Corporation) and 14.5 parts by mass of m-phenylenediamine (manufactured by Sigma-Aldrich Japan) were placed. After that, to reduce the viscosity of the above jER828 and to dissolve m-phenylenediamine, the container was heated at a temperature of 75° C. for 15 minutes. The two compounds were then mixed well and degassed in vacuo at a temperature of 80° C. for about 15 minutes.

(b) Fixation of Single Yarn of Carbon Fiber to Dedicated Mold

From the carbon fiber bundle, a single fiber was drawn out, and both ends of the single fiber was fixed to a dumbbell-shaped mold in the longitudinal direction by an adhesive with a certain tension applied to the single fiber. After that, to remove the water attached on the single yarn of the carbon fiber and the mold, vacuum drying was carried out at a temperature of 80° C. for 30 minutes or more. The dumbbell-shaped mold is made of silicone rubber and has a casting part with a central width of 5 mm, a length of 25 mm, an end width of 10 mm, and a total length of 150 mm.

(c) Casting and Curing of Resin Into the mold vacuum dried in the procedure of the step (b), the resin prepared in the step (a) was cast. Using an oven, the temperature was raised to a temperature of 75° C. at a rate of 1.5° C./min and held at 75° C. for 2 hours, and the temperature was then raised to a temperature of 125° C. at a rate of 1.5 minutes, held at 125° C. for 2 hours, and then lowered to a temperature of 30° C. at a rate of 2.5° C./min. The resin was then removed from the mold to give a test piece.

(d) Measurement of Interfacial Shear Strength (IFSS)

To the test piece obtained in the procedure of the step (c), a tensile force was applied in the fiber axis direction (the longitudinal direction) to cause a 12% strain, and then the number N of fiber breakages in a 22 mm central part of the test piece was counted using a polarizing microscope. Next, an average length of broken fibers la was calculated by the equation: la ($\mu$m)=22×1,000 ($\mu$m)/N, and using the average length of broken fibers la, a critical fiber length lc was calculated by the equation: lc ($\mu$m)=(4/3)×la ($\mu$m). A strand tensile strength $\sigma$ and a diameter d of the single yarn of the carbon fiber were measured, and an interfacial shear strength IFSS, an index of adhesive strength between the carbon fiber and the resin interface, was calculated by the following equation. In Examples, the average of five measurements was used as the test result.

Interfacial Shear Strength IFSS (MPa)=$\sigma$ (MPa)×$d$ ($\mu$m)/(2×lc)($\mu$m)

In the present invention, 25 MPa or more is preferred range, 25 MPa or more was defined as O, and less than 25 MPa was defined as x.

<Measurement of Amount of Attached Sizing Agent>

About 2 g of a sizing agent coated carbon fiber bundle was weighed (W1) (to the fourth decimal place), then placed in an electric furnace (capacity: 120 cm$^3$) set at a temperature of 450° C., and allowed to stand for 15 minutes under a nitrogen stream of 50 mL/min to completely pyrolyze the sizing agent. Then, the resulting carbon fiber bundle was transferred into a container under a dry nitrogen stream of 20

L/min, cooled for 15 minutes, and then weighed (W2) (to the fourth decimal place). The amount of attached sizing agent was obtained by the following equation.

Amount of Attached Sizing (mass %)=[$W1$ (g)−$W2$ (g)]/[$W1$ (g)]×100

The value obtained by converting the amount of attached sizing to the amount per 100 parts by mass of the carbon fiber bundle (rounded off to the second decimal place) was used as a part by mass of the attached sizing agent. In this example, the average value of two measurements was used as a part by mass of the attached sizing agent. Further, the resulting carbon fiber bungle was divided into three equal parts by mass in the width direction along the fiber direction, and the mass fractions of the sizing agents with respect to the masses of the carbon fiber bundle in the center part and each of the both end parts were obtained by the same method. Then, the simple average value of the mass fractions of the both right and left end parts was taken, and the value obtained by dividing the simple average value by the mass fraction of the center part was used as an amount ratio of the sizing agent attached to the both end parts/center part.

<Evaluation of Abrasion Resistance>

Four stainless bars having a smooth surface with a diameter of 10 mm were arranged in zigzag such that the fiber carbon bundle passes while coming into contact at an angle of 60°. The resulting sizing agent coated carbon fiber bundle was allowed to pass through this device at a rate of 3 m/min while applying an initial tension of 3000 g. Appearance as to 3 m of the carbon fiber bundle was visually evaluated from the perpendicular direction to the carbon fiber bundle, and determined as ⊙ for one in which fluff was not found, O for one in which less than 5 fluffs were found per 1 m of the carbon fiber bundle of a total number of filaments of 12,000, Δ for one in which 5 or more and less than 10 fluffs were found, and x for one in which 10 or more of many fluffs were found.

<Evaluation of Drape Value>

The sizing agent-attached carbon fiber bundle was cut into 100 cm or more, and the upper end face of the carbon fiber bundle was stuck to a bar parallel to the ground by a tape, twisting was removed from the upper end of the yarn, a weight of 18 g±1 g was hung from the lower end of the yarn, and the carbon fiber bundle was left for 30 minutes or more. The weight was removed, and a sizing agent attached carbon fiber bundle cut into 30 cm from the bottom was placed on a base having a height of 25 cm or more with a horizontal ceiling part in the state that twisting of yarn bundle was released, and was supported in the state that the part of 25 cm from the tip of the carbon fiber bundle was horizontally projected into the air. After a lapse of one second from removal of the support, a distance of the yarn bundle tip part from the measurement base was read, and this value was used as a drape value (mm). The measurement temperature is 23±5° C.

Example 1

This example involves a first step and a second step described below.

First Step: Step of Producing Carbon Fiber Bundle

A copolymer made of 99 mol % of acrylonitrile and 1 mol % of itaconic acid was spun and then fired to give a carbon fiber bundle having a total number of filaments of 12,000, a specific gravity of 1.8, a strand tensile strength of 6.2 GPa, and a strand tensile modulus of 300 GPa. Subsequently, the carbon fiber bundle was subjected to an electrolytic surface treatment at a quantity of electricity of 100 coulombs per 1 g of the carbon fiber bundle using an aqueous ammonium hydrogen carbonate solution at a concentration of 0.1 mol/L as an electrolyte solution. The electrically surface-treated carbon fiber bundle was then washed with water and dried in hot air at a temperature of 150° C. to give a carbon fiber bundle serving as a raw material. This is used as carbon fiber bundle (A).

Second Step: Step of Fabricating Sizing agent coated Carbon Fiber Bundle and Evaluations (I) used as a sizing agent component was completely dissolved using water as a solvent to prepare a sizing agent solution. The boiling point of this water was 100° C. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 140° C. for 10 seconds. At this time, the tension of the carbon fiber bundle was adjusted such that the flatness ratio of the carbon fiber bundle was 110. Thereafter, the resulting carbon fiber bundle was further heat-treated at a temperature of 210° C. for 180 seconds to obtain a sizing agent coated carbon fiber bundle. The average amount of the sizing agent attached to the carbon fiber bundle was measured by the method described above, and adjusted so as to be 1 part by mass per 100 parts by mass of the surface-treated carbon fiber bundle.

As a result of measuring the interfacial shear strength of the resulting sizing agent coated carbon fiber bundle by the method described above, it was found that the sizing agent coated carbon fiber bundle had sufficiently high adhesion. As to the resulting sizing agent coated carbon fiber bundle, the amount ratio of the sizing agent attached to the both end parts/center part was 1.2, and when abrasion resistance was evaluated by the method described above, fluff was not found, and very good abrasion resistance was shown.

TABLE 1

| | | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| | Carbon fiber | A | A | A | A | A | A | A | A | A | B | A |
| | Sizing agent | I | I | I | I | I | I | I | I | I | I | II |
| Attachment process | Angle drawn from sizing solution [° C.] | 60 | 60 | 60 | 90 | 60 | 60 | 60 | 60 | 60 | 60 | 60 |
| | Time required after drawing until roller [s] | 10 | 10 | 10 | 10 | 90 | 10 | 10 | 10 | 10 | 10 | 10 |
| | Roller temperature [° C.] | 140 | 120 | 160 | 140 | 140 | 140 | 140 | 190 | 140 | 140 | 140 |
| | contacting time [s] | 10 | 10 | 10 | 10 | 10 | 5 | 50 | 10 | 10 | 10 | 10 |
| | Drying temperature [° C.] | 210 | 210 | 210 | 210 | 210 | 210 | 210 | 210 | 210 | 210 | 210 |
| | Drying time [s] | 180 | 180 | 180 | 180 | 180 | 180 | 180 | 180 | 180 | 180 | 180 |

TABLE 1-continued

|  |  | Example 1 | Example 2 | Example 3 | Example 4 | Example 5 | Example 6 | Example 7 | Example 8 | Example 9 | Example 10 | Example 11 |
|---|---|---|---|---|---|---|---|---|---|---|---|---|
| Evaluation | Adhesion | ○ | ○ | ○ | ○ | ○ | ○ | ○ | ○ | ○ | ○ | ○ |
|  | Average attached amount [%] | 1 | 1 | 1 | 1 | 1 | 1 | 1 | 1 | 1 | 1 | 1 |
|  | Flatness ratio | 110 | 110 | 110 | 110 | 110 | 110 | 110 | 110 | 50 | 110 | 110 |
|  | Adhesion amount ratio of both end parts/center part | 1.2 | 1.2 | 1.3 | 1.1 | 1.1 | 1.2 | 1.2 | 1.4 | 1.1 | 1.1 | 1.2 |
|  | Abrasion resistance | ⊚ | ⊚ | ⊚ | ○ | ○ | ⊚ | ⊚ | ⊚ | ○ | ○ | ⊚ |

Examples 2, 3

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the temperature of the heated roller was changed as shown in Table 1.

The resulting sizing agent coated carbon fiber bundle had sufficiently high adhesion and also very good abrasion resistance. The results are shown in Table 1.

Example 4

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the surface-treated carbon fiber bundle was immersed in the sizing agent solution, then the carbon fiber bundle was drawn from the sizing agent solution, such that the angle formed by a liquid level of the sizing agent solution and the carbon fiber bundle was 90 degrees.

The resulting sizing agent coated carbon fiber bundle had sufficiently high adhesion and good abrasion resistance. The results are shown in Table 1.

Example 5

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the carbon fiber bundle was drawn from the sizing agent solution, then run via a guide roller for 90 seconds until the carbon fiber bundle is brought into contact with the heated roller.

The resulting sizing agent coated carbon fiber bundle had sufficiently high adhesion and good abrasion resistance. The results are shown in Table 1.

Example 6

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the time to bring the carbon fiber bundle into contact with the heated roller was changed to 5 seconds.

The resulting sizing agent coated carbon fiber bundle had sufficiently high adhesion and very good abrasion resistance. The results are shown in Table 1.

Example 7

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the time to bring the carbon fiber bundle into contact with the heated roller was changed to 50 seconds.

The resulting sizing agent coated carbon fiber bundle had sufficiently high adhesion and very good abrasion resistance. However, the tendency that stain derived from the sizing agent much adheres on the heated roller was seen. The results are shown in Table 1.

Example 8

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations (I) used as a sizing agent component was completely dissolved using dimethylformamide (manufactured by Wako Pure Chemical Industries, Ltd.) as a solvent to prepare a sizing agent solution. The boiling point of this dimethylformamide was 153° C. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 190° C. for 10 seconds. Thereafter, a sizing agent coated carbon fiber bundle was obtained in the same manner as in Example 1.

The resulting sizing agent coated carbon fiber bundle had sufficiently high adhesion and very good abrasion resistance. The results are shown in Table 1.

Example 9

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the tension of the carbon fiber bundle was adjusted such that the flatness ratio of the sizing agent coated carbon fiber bundle was 50.

The resulting sizing agent coated carbon fiber bundle had sufficiently high adhesion and good abrasion resistance. The results are shown in Table 1.

Example 10

First Step: Step of Producing Carbon Fiber Bundle Serving as Raw Material

A copolymer made of 99 mol % of acrylonitrile and 1 mol % of itaconic acid was spun and then fired to give a carbon fiber bundle having a total number of filaments of 12,000, a specific gravity of 1.8, a strand tensile strength of 4.9 GPa, and a strand tensile modulus of 230 GPa. Subsequently, the carbon fiber bundle was subjected to an electrolytic surface treatment at a quantity of electricity of 100 coulombs per 1 g of the carbon fiber bundle using an aqueous ammonium hydrogen carbonate solution at a concentration of 0.1 mol/L as an electrolyte solution. The electrically surface-treated carbon fiber bundle was then washed with water and dried in hot air at a temperature of 150° C. to give a carbon fiber bundle serving as a raw material. This is used as carbon fiber bundle (B).

Second Step: Step of Fabricating Sizing agent coated Carbon Fiber Bundle and Evaluations The same procedure as in Example 1 was carried out.

The resulting sizing agent coated carbon fiber bundle had sufficiently high adhesion and good abrasion resistance. The results are shown in Table 1.

Example 11

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except for using (II) as a sizing agent component.

The resulting sizing agent coated carbon fiber bundle had sufficiently high adhesion and very good abrasion resistance. The results are shown in Table 1.

Example 12

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations (III) used as a sizing agent component was completely dissolved using dimethylformamide (first class grade; manufactured by Wako Pure Chemical Industries, Ltd.) as a solvent to prepare a sizing agent solution. The boiling point of this dimethylformamide was 153° C. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 190° C. for 10 seconds. Thereafter, a sizing agent coated carbon fiber bundle was obtained in the same manner as in Example 1.

As a result of measuring the interfacial shear strength of the resulting sizing agent coated carbon fiber bundle by the method described above, the adhesion was found to be insufficient. On the other hand, when the drape value was evaluated by the method described above, the sizing agent coated carbon fiber bundle had very good shape stability. The results are shown in Table 2.

TABLE 2

|  |  | Example 12 |
| --- | --- | --- |
|  | Carbon fiber | A |
|  | Sizing agent | III |
| Attachment process | Angle drawn from sizing solution [° C.] | 60 |
|  | Time required after drawing until roller [s] | 10 |
|  | Roller temperature [° C.] | 190 |
|  | contacting time [s] | 10 |
|  | Drying temperature [° C.] | 210 |
|  | Drying time [s] | 180 |
| Evaluation | Adhesion | X |
|  | Average attached amount [%] | 1 |
|  | Flatness ratio | 110 |
|  | Adhesion amount ratio of both end parts/center part | 1.2 |
|  | Abrasion resistance | ◎ |
|  | Drape value [mm] | 110 |

Example 13

First Step: Step of Producing Carbon Fiber Bundle The same procedure as in Example 1 was carried out.

Second Step: Step of Fabricating Sizing agent coated Carbon Fiber Bundle and Evaluations (IV) used as a sizing agent component was completely dissolved using water as a solvent to prepare a sizing agent solution at the concentration shown in Table 3. The boiling point of this water was 100° C. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 140° C. for 10 seconds. Thereafter, the resulting carbon fiber bundle was further heat-treated at a temperature of 210° C. for 180 seconds to obtain a sizing agent coated carbon fiber bundle. The average amount of the sizing agent attached to the carbon fiber bundle was measured by the method described above, and adjusted so as to be 1 part by mass per 100 parts by mass of the surface-treated carbon fiber bundle.

As to the resulting sizing agent coated carbon fiber bundle, the amount ratio of the sizing agent attached to the both end parts/center part was 1.2, and when abrasion resistance was evaluated by the method described above, fluff was not found, and very good abrasion resistance was shown. In addition, when the drape value was evaluated by the method described above, the sizing agent coated carbon fiber bundle had very good shape stability.

TABLE 3

|  |  | Example 13 | Example 14 | Example 15 | Example 16 | Example 17 | Example 18 | Example 19 | Example 20 |
|---|---|---|---|---|---|---|---|---|---|
|  | Carbon fiber | A | A | A | A | A | A | A | A |
| Sizing agent | Main agent | IV | V | VI | IV | IV | IV | IV | IV |
|  | Solution concentration [%] | 1.4 | 1.4 | 1.4 | 1.4 | 1.4 | 1.4 | 1.4 | 1.4 |
| Attachment process | Angle drawn from sizing solution [° C.] | 60 | 60 | 60 | 60 | 60 | 90 | 60 | 60 |
|  | Time required after drawing until roller [s] | 10 | 10 | 10 | 10 | 10 | 10 | 60 | 10 |
|  | Roller temperature [° C.] | 140 | 140 | 140 | 120 | 170 | 140 | 140 | 140 |
|  | contacting time [s] | 10 | 10 | 10 | 10 | 10 | 10 | 10 | 5 |
|  | Drying temperature [° C.] | 210 | 210 | 210 | 210 | 210 | 210 | 210 | 210 |
|  | Drying time [s] | 180 | 180 | 180 | 180 | 180 | 180 | 180 | 180 |
| Evaluation | Flatness ratio | 110 | 100 | 120 | 105 | 110 | 110 | 110 | 115 |
|  | Average attached amount [%] | 1 | 1 | 1 | 1 | 1 | 0.8 | 0.9 | 1 |
|  | Amount ratio attached to both end parts/center part | 1.2 | 1.1 | 1.1 | 1.2 | 1.4 | 1.1 | 1.1 | 1.2 |
|  | Abrasion resistance | ⊚ | ○ | ○ | ○ | ⊚ | ○ | ○ | ⊚ |
|  | Drape value [mm] | 160 | 180 | 120 | 160 | 160 | 140 | 130 | 140 |

|  |  | Example 21 | Example 22 | Example 23 | Example 24 | Example 25 | Example 26 | Example 27 |
|---|---|---|---|---|---|---|---|---|
|  | Carbon fiber | A | A | A | A | A | A | A |
| Sizing agent | Main agent | IV | IV | IV | IV | IV | IV | IV |
|  | Solution concentration [%] | 1.4 | 1.4 | 1.4 | 1.4 | 0.7 | 2 | 4 |
| Attachment process | Angle drawn from sizing solution [° C.] | 60 | 60 | 60 | 60 | 60 | 60 | 60 |
|  | Time required after drawing until roller [s] | 10 | 10 | 10 | 10 | 10 | 10 | 10 |
|  | Roller temperature [° C.] | 140 | 140 | 140 | 140 | 140 | 140 | 140 |
|  | contacting time [s] | 30 | 10 | 10 | 10 | 10 | 10 | 10 |
|  | Drying temperature [° C.] | 210 | Nil | 160 | 260 | 210 | 210 | 210 |
|  | Drying time [s] | 180 |  | 30 | 600 | 180 | 180 | 180 |
| Evaluation | Flatness ratio | 120 | 100 | 120 | 120 | 140 | 80 | 80 |
|  | Average attached amount [%] | 1 | 1 | 1 | 1 | 0.5 | 1.4 | 2 |
|  | Amount ratio attached to both end parts/center part | 1.3 | 1.1 | 1.2 | 1.1 | 1.1 | 1.3 | 1.2 |
|  | Abrasion resistance | ○ | ○ | ○ | Δ | Δ | ⊚ | ○ |
|  | Drape value [mm] | 170 | 80 | 110 | 180 | 70 | 180 | 220 |

Example 14

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except for using (V) as a sizing agent component.

The resulting sizing agent coated carbon fiber bundle had good abrasion resistance and also high shape stability. The results are shown in Table 3.

Example 15

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except for using (VI) as a sizing agent component.

The resulting sizing agent coated carbon fiber bundle had good abrasion resistance and also high shape stability. The results are shown in Table 3.

Examples 16, 17

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the temperature of the heated roller was changed as shown in Table 3.

The resulting sizing agent coated carbon fiber bundle had good abrasion resistance and also high shape stability. The results are shown in Table 3.

Example 18

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the surface-treated carbon fiber bundle was immersed in the sizing agent solution, then the carbon fiber bundle was drawn from the sizing agent solution, such that the angle formed by a liquid level of the sizing agent solution and the carbon fiber bundle was 90 degrees.

The resulting sizing agent coated carbon fiber bundle had good abrasion resistance and also high shape stability. The results are shown in Table 3.

Example 19

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the carbon fiber bundle was drawn from the sizing agent solution, then run via a guide roller for 60 seconds until the carbon fiber bundle is brought into contact with the heated roller.

The resulting sizing agent coated carbon fiber bundle had good abrasion resistance and also high shape stability. The results are shown in Table 2.

Example 20

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the time to bring the carbon fiber bundle into contact with the heated roller was changed to 5 seconds.

The resulting sizing agent coated carbon fiber bundle had very good abrasion resistance and also high shape stability. The results are shown in Table 3.

Example 21

First Step: Step of Producing Carbon Fiber Bundle Serving as Raw Material

The same procedure as in Example 1 was carried out.

Second Step: Step of Fabricating Sizing agent coated Carbon

Fiber Bundle and Evaluations

A sizing agent coated carbon fiber bundle was obtained in the same manner as in Example 13, except that the time to bring the carbon fiber bundle into contact with the heated roller was changed to 30 seconds.

The resulting sizing agent coated carbon fiber bundle had good abrasion resistance and also high shape stability. The results are shown in Table 3.

Example 22

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations The surface-treated carbon fiber bundle was immersed using (IV) as a sizing agent component, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 140° C. for 10 seconds to obtain a sizing agent coated carbon fiber bundle.

The resulting sizing agent coated carbon fiber bundle had abrasion resistance and also shape stability. The results are shown in Table 3.

Examples 23, 24

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that heat treatment was performed at a drying temperature and drying time after brought into contact with the roller as shown in Table 3.

The resulting sizing agent coated carbon fiber bundle had abrasion resistance and also high shape stability. The results are shown in Table 3.

Examples 25 to 27

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the average amount of the sizing agent attached to the carbon fiber bundle was adjusted as shown in Table 3.

The resulting sizing agent coated carbon fiber bundle had abrasion resistance and also shape stability. The results are shown in Table 3.

Comparative Example 1

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent solution was prepared in the same manner as in Example 1. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 80° C. for 3 seconds. Thereafter, the resulting carbon fiber bundle was further heat-treated at a temperature of 210° C. for 180 seconds to obtain a sizing agent coated carbon fiber bundle. The average amount of the sizing agent attached to the carbon fiber bundle was measured by the method described above, and adjusted so as to be 1 part by mass per 100 parts by mass of the surface-treated carbon fiber.

As to the resulting sizing agent coated carbon fiber bundle, the amount ratio of the sizing agent attached to the both end parts/center part was 1.0. Also, the adhesion of the resulting sizing agent coated carbon fiber bundle was sufficiently high, but many fluffs were found, thus abrasion resistance was found to be poor. The results are shown in Table 4.

method described above, countless fluffs were found, and abrasion resistance was found to be remarkably lowered. Also, the number of fluffs of the carbon fiber bundle was very large, and it was difficult to divide the carbon fiber bundle into the center part and the both end parts, thus the

TABLE 4

|  |  | Comparative Example 1 | Comparative Example 2 | Comparative Example 3 |
|---|---|---|---|---|
|  | Carbon fiber | A | A | A |
|  | Sizing agent | I | I | I |
| Attachment process | Angle drawn from sizing solution [° C.] | 60 | 60 | 60 |
|  | Time required after drawing until roller [s] | 10 | 10 | 10 |
|  | Roller temperature [° C.] | 80 | 140 | 250 |
|  | Roller contacting time [s] | 3 | 0.5 | 10 |
|  | Drying temperature [° C.] | 210 | 210 | 210 |
|  | Drying time [s] | 180 | 180 | 180 |
| Evaluation | Adhesion | ○ | ○ | ○ |
|  | Average attached amount [8] | 1 | 1 | — |
|  | Flatness ratio | 110 | 110 | — |
|  | Adhesion amount ratio of both end parts/center part | 1.0 | 1.0 | — |
|  | Abrasion resistance | X | X | X |

Comparative Example 2

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 1, except that the time to bring the carbon fiber bundle into contact with the heated roller was changed to 0.5 seconds.

As to the resulting sizing agent coated carbon fiber bundle, the ratio of the mass fraction of the sizing agent to the carbon fiber bundle on the center part to the both end parts was 1.0. Also, the adhesion of the resulting sizing agent coated carbon fiber bundle was sufficiently high, but many fluffs were found, thus abrasion resistance was found to be poor. The results are shown in Table 4.

Comparative Example 3

First Step: Step of Producing Carbon Fiber Bundle Serving as Raw Material

The same procedure as in Example 1 was carried out.

Second Step: Step of Fabricating Sizing agent coated Carbon

Fiber Bundle and Evaluations

A sizing agent coated carbon fiber bundle was obtained in the same manner as in Example 1, except that the temperature of the heated roller was changed to 250° C.

As to the resulting sizing agent coated carbon fiber bundle, when abrasion resistance was evaluated by the amount ratio of the sizing agent attached to the both end parts/center part could not be obtained. The results are shown in Table 4.

Comparative Example 4

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent solution was prepared in the same manner as in Example 13. The surface-treated carbon fiber bundle was immersed in the sizing agent solution, then the carbon fiber bundle was drawn from the sizing agent solution, such that the angle formed by a liquid level of the sizing agent solution and the carbon fiber bundle was 60 degrees, and the carbon fiber bundle was run via a guide roller, and after a lapse of 10 seconds, brought into a contact with a roller heated to 80° C. for 5 seconds to obtain a sizing agent coated carbon fiber bundle. The average amount of the sizing agent attached to the carbon fiber bundle was measured by the method described above, and adjusted so as to be 1 part by mass per 100 parts by mass of the surface-treated carbon fiber.

The resulting sizing agent coated carbon fiber bundle was converged and had a low flatness ratio. The amount ratio of the sizing agent attached to the both end parts/center part was 1.0. Many fluffs were found in the resulting sizing agent coated carbon fiber bundle, thus abrasion resistance was found to be poor. In addition, it was found that the drape value was low, and shape stability was poor. The results are shown in Table 5.

TABLE 5

|  |  | Comparative Example 4 | Comparative Example 5 | Comparative Example 6 | Comparative Example 7 | Comparative Example 8 | Comparative Example 9 |
|---|---|---|---|---|---|---|---|
|  | Carbon fiber | A | A | A | A | A | A |
| Sizing agent | Main agent | IV | IV | IV | IV | VII | VIII |
|  | Solution concentration [%] | 1.4 | 1.4 | 1.4 | 1.4 | 1.4 | 1.4 |
| Attachment process | Angle drawn from sizing solution [° C.] | 60 | 60 | 60 | 60 | 60 | 60 |
|  | Time required after drawing until roller [s] | 10 | 10 | 10 | 10 | 10 | 10 |

TABLE 5-continued

|  |  | Comparative Example 4 | Comparative Example 5 | Comparative Example 6 | Comparative Example 7 | Comparative Example 8 | Comparative Example 9 |
|---|---|---|---|---|---|---|---|
|  | Roller temperature [° C.] | 80 | 130 | 200 | Roller | 140 | 140 |
|  | Roller contacting time [s] | 5 | 0.5 | 3 | Nil | 10 | 10 |
|  | Drying temperature [° C.] | 210 | 210 | — | 210 | 210 | 210 |
|  | Drying time [s] | 180 | 180 | — | 180 | 180 | 180 |
| Evaluation | Flatness ratio | 80 | 50 | — | 1 | 110 | 90 |
|  | Average attached amount [%] | 1 | 1 | — | 1 | 1 | 1 |
|  | Amount ratio attached to both end parts/center part | 1.0 | 1.0 | — | 1.0 | 1.2 | 1.1 |
|  | Abrasion resistance | X | X | — | X | ◯ | X |
|  | Drape value [mm] | 70 | 60 | — | 50 | 215 | 70 |

Comparative Example 5

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the time to bring the carbon fiber bundle into contact with the heated roller was changed to 0.5 seconds.

The resulting sizing agent coated carbon fiber bundle was converged and had a low flatness ratio. The amount ratio of the sizing agent attached to the both end parts/center part was 1.0. Many fluffs were found in the resulting sizing agent coated carbon fiber bundle, thus abrasion resistance was found to be poor. In addition, it was found that the drape value was low, and shape stability was poor. The results are shown in Table 5.

Comparative Example 6

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations When the temperature of the heated roller was changed to 200° C. from the method of Example 13, the carbon fiber bundle was fused due to the stain adhered on the heated roller, and a good carbon fiber bundle could not be obtained.

Comparative Example 7

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except that the carbon fiber bundle was not brought into contact with the heated roller.

The resulting sizing agent coated carbon fiber bundle became a converged cylindrical bundle, and the amount ratio of the sizing agent attached to the both end parts/center part was 1.0. Many fluffs were found in the resulting sizing agent coated carbon fiber bundle, thus abrasion resistance was found to be poor. In addition, it was found that the drape value was low, and shape stability was poor. The results are shown in Table 5.

Comparative Example 8

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except for using (VII) as a sizing agent component.

As to the resulting sizing agent coated carbon fiber bundle, the amount ratio of the sizing agent attached to the both end parts/center part was 1.2. The resulting sizing agent coated carbon fiber bundle had good abrasion resistance, but it was found that the drape value was high, and processability was poor. The results are shown in Table 5.

Comparative Example 9

First Step: Step of Producing Carbon Fiber Bundle Serving as Raw Material

The same procedure as in Example 1 was carried out.

Second Step: Step of Fabricating Sizing agent coated Carbon Fiber Bundle and Evaluations A sizing agent coated carbon fiber bundle was obtained in the same manner as in Example 13, except for using (VIII) as a sizing agent component.

As to the resulting sizing agent coated carbon fiber bundle, the amount ratio of the sizing agent attached to the both end parts/center part was 1.1. Many fluffs were found in the resulting sizing agent coated carbon fiber bundle, thus abrasion resistance was found to be poor. In addition, it was found that the drape value was low, and shape stability was poor. The results are shown in Table 5.

The invention claimed is:

1. A method for producing a sizing agent coated carbon fiber bundle,
    wherein the sizing agent coated carbon fiber bundle is a carbon fiber bundle coated with (A) a sizing agent containing a polyether-derived aliphatic epoxy compound and/or polyol-derived aliphatic epoxy compound having two or more epoxy groups in a molecule or (B) a sizing agent containing a water-insoluble compound having a glass transition temperature of −100° C. or more and 50° C. or less,
    wherein the flatness ratio (width/thickness) of the cross section of the carbon fiber bundle is more than 90 and is 150 or less, and
    when the carbon fiber bundles are divided into three equal parts by mass in the width direction along the fiber direction, the amount ratio of the sizing agent attached on the both end parts/center part calculated from the average value of the ratios of the masses of the sizing agent to the masses of the carbon fiber bundle in each of the both end parts and the ratio of the mass of the sizing agent to the mass of the carbon fiber bundle in the center part is 1.05 or more and 1.5 or less, wherein said method comprises:
- impregnating a carbon fiber bundle with a sizing agent solution containing the (A) sizing agent and then brought into contact with a roller heated in a temperature range higher than the boiling point of a solvent of the sizing agent solution by 10° C. or more and 80° C. or less for one second or more and 60 seconds or less,
- wherein a time after impregnating the carbon fiber bundle with the sizing agent solution and before the carbon fiber bundle is brought into contact with the roller is 5 seconds or more and 60 seconds or less; and
- wherein, in a process of taking out the carbon fiber bundle from the sizing agent solution after impregnating the carbon fiber bundle with the sizing agent solution, the angle formed by a liquid level of the sizing agent solution and the carbon fiber bundle is 20 degrees or more and 70 degrees or less.

2. The method for producing the sizing agent coated carbon fiber bundle according to claim 1,
   wherein the aliphatic epoxy compound (A) is a glycidyl-ether-derived epoxy compound obtained by the reaction of one member selected from a group consisting of glycerol, digylcerol, polyglycerol, trimethylolpropane, pentaerythritol, sorbitol and arabitol, with epichlorohydrin.

3. The method for producing the sizing agent coated carbon fiber bundle according to claim 1,
   wherein the average amount of attached sizing agent is 0.2 mass % or more and less than 1.5 mass %.

4. The method for producing the sizing agent coated carbon fiber bundle according to claim 1,
   wherein the carbon fiber bundle has a strand tensile strength of 3.5 GPa or more, and
   wherein the carbon fiber bundle has a strand tensile modulus of 220 GPa or more.

5. The method for producing the sizing agent coated carbon fiber bundle according to claim 1, wherein
   when the carbon fiber bundles are divided into three equal parts by mass in the width direction along the fiber direction, the amount ratio of the sizing agent attached on both of the end parts/center part calculated from the average value of the ratios of the masses of the sizing agent to the masses of the carbon fiber bundle in each of the both end parts and the ratio of the mass of the sizing agent to the mass of the carbon fiber bundle in the center part is 1.2 or more and 1.5 or less.

* * * * *